United States Patent
Ingersoll et al.

(10) Patent No.: US 10,809,064 B2
(45) Date of Patent: Oct. 20, 2020

(54) IMAGE GEO-REGISTRATION FOR ABSOLUTE NAVIGATION AIDING USING UNCERTAINY INFORMATION FROM THE ON-BOARD NAVIGATION SYSTEM

(71) Applicant: Raytheon Company, Waltham, MA (US)

(72) Inventors: James K. Ingersoll, Tucson, AZ (US); Michael Vaujin, Oro Valley, AZ (US); James T. Landon, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 277 days.

(21) Appl. No.: 15/891,806

(22) Filed: Feb. 8, 2018

(65) Prior Publication Data

US 2019/0242711 A1    Aug. 8, 2019

(51) Int. Cl.

| | | |
|---|---|---|
| *G01C 21/16* | (2006.01) | |
| *G01C 23/00* | (2006.01) | |
| *G01C 21/00* | (2006.01) | |
| *F41G 7/34* | (2006.01) | |
| *G01C 21/32* | (2006.01) | |
| *G01C 11/02* | (2006.01) | |
| *G01C 21/26* | (2006.01) | |

(Continued)

(52) U.S. Cl.
CPC ........... *G01C 21/005* (2013.01); *F41G 7/343* (2013.01); *G01C 11/02* (2013.01); *G01C 21/32* (2013.01); *G01C 23/00* (2013.01); *G01C 21/165* (2013.01); *G01C 21/203* (2013.01); *G01C 21/26* (2013.01); *G01C 21/30* (2013.01)

(58) Field of Classification Search
CPC combination set(s) only.
See application file for complete search history.

(56) References Cited

U.S. PATENT DOCUMENTS

| | | |
|---|---|---|
| 5,995,681 A | 11/1999 | Lee et al. |
| 7,395,156 B2 | 7/2008 | Chiou et al. |

(Continued)

OTHER PUBLICATIONS

Carr et al., "Digital Scene Matching Area Correlator (DSMAC)", Proc. SPIE 0238, Image Processing for Missile Guidance, (Dec. 23, 1980); doi: 10.1117/12.959130; http://dx.doi.org/10.1117/12.959130.

(Continued)

*Primary Examiner* — Christian Chace
*Assistant Examiner* — Amelia J. I. Vorce
(74) *Attorney, Agent, or Firm* — Schwegman Lundberg & Woessner, P.A.

(57) ABSTRACT

A system and method for feeding back and incorporating the uncertainty distribution of the state estimate output by the INS in the image geo-registration process to handle larger navigation errors, provide a full six degree of freedom position and attitude absolute navigation update for the navigation system and provide a more accurate update for autonomous aerial, underwater or ground vehicles. Generating the update simultaneously for multiple images may provide a more robust solution to address any observability issues that may be present, the ability to fuse different sensor modalities and in general more accurate updates. Key frames may be used to improve the computational efficiency of the method.

22 Claims, 16 Drawing Sheets

OPTIMIZATION SEARCH SPACE

UNCERTAINTY DISTRIBUTION PROVIDED BY THE NAVIGATION SYSTEM

(51) Int. Cl.
*G01C 21/20* (2006.01)
*G01C 21/30* (2006.01)

(56) References Cited

U.S. PATENT DOCUMENTS

| | | | |
|---|---|---|---|
| 9,031,782 B1* | 5/2015 | Lemay | G01C 21/00 |
| | | | 701/445 |
| 9,110,170 B1 | 8/2015 | Woollard et al. | |
| 9,798,928 B2* | 10/2017 | Carr | G06K 9/0063 |
| 10,346,949 B1* | 7/2019 | Raitarovskyi | G06T 3/0068 |
| 2002/0079425 A1* | 6/2002 | Rhoads | G01J 9/00 |
| | | | 250/201.9 |
| 2007/0008312 A1* | 1/2007 | Zhou | G06T 7/80 |
| | | | 345/419 |
| 2011/0218733 A1 | 9/2011 | Hamza et al. | |
| 2012/0141014 A1* | 6/2012 | Lepikhin | H04N 9/735 |
| | | | 382/154 |
| 2013/0077891 A1* | 3/2013 | Nimnual | G06T 3/0068 |
| | | | 382/276 |
| 2013/0204831 A1* | 8/2013 | Reshef | G06N 5/04 |
| | | | 706/48 |
| 2015/0369923 A1* | 12/2015 | Morin | G01C 21/165 |
| | | | 701/472 |
| 2016/0047657 A1 | 2/2016 | Caylor et al. | |
| 2016/0195878 A1 | 7/2016 | Peleg et al. | |
| 2017/0329335 A1* | 11/2017 | DelMarco | G06T 7/32 |
| 2019/0304168 A1* | 10/2019 | Korb | G06T 15/20 |

OTHER PUBLICATIONS

Pritt et al., "Aircraft navigation by means of image registration," 2013 IEEE Applied Imagery Pattern Recognition (AIPR), Washington, DC, 2013, pp. 1-6. doi: 10.1109/AIPR.2013.6749335.

Pritt et al., "Error propagation for DEM-based georegistration of motion imagery," 2011 IEEE Applied Imagery Pattern Recognition Workshop (AIPR), Washington, DC, 2011, pp. 1-6. doi: 10.1109/AIPR.2011.6176342.

Pritt et al, "Automated georegistration of motion imagery," 2011 IEEE Applied Imagery Pattern Recognition (AIPR), Washington, DC, 2011, pp. 1-6. doi: 10.1109/AIPR.2011.6176343.

* cited by examiner

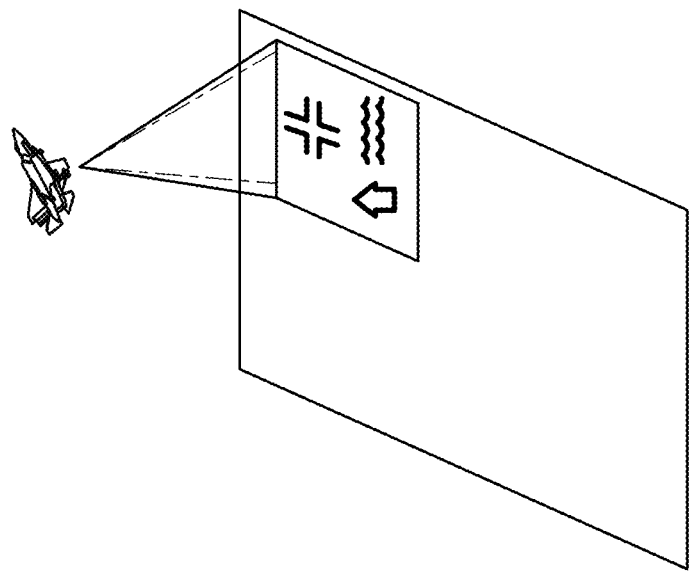
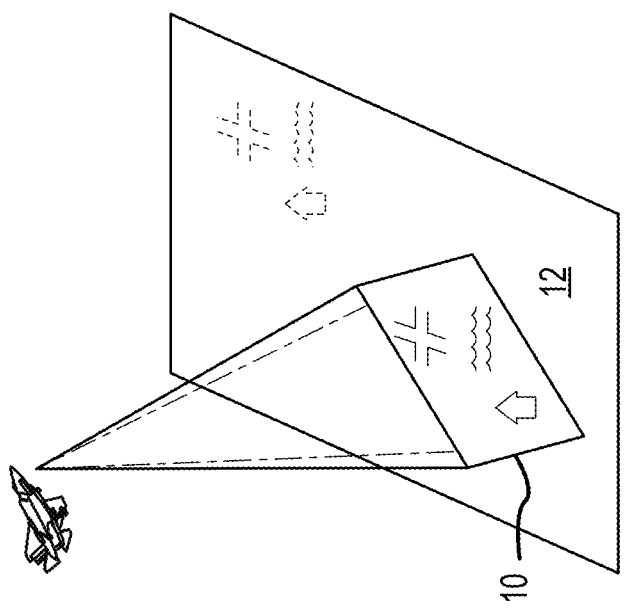
FIG. 1
(PRIOR ART)

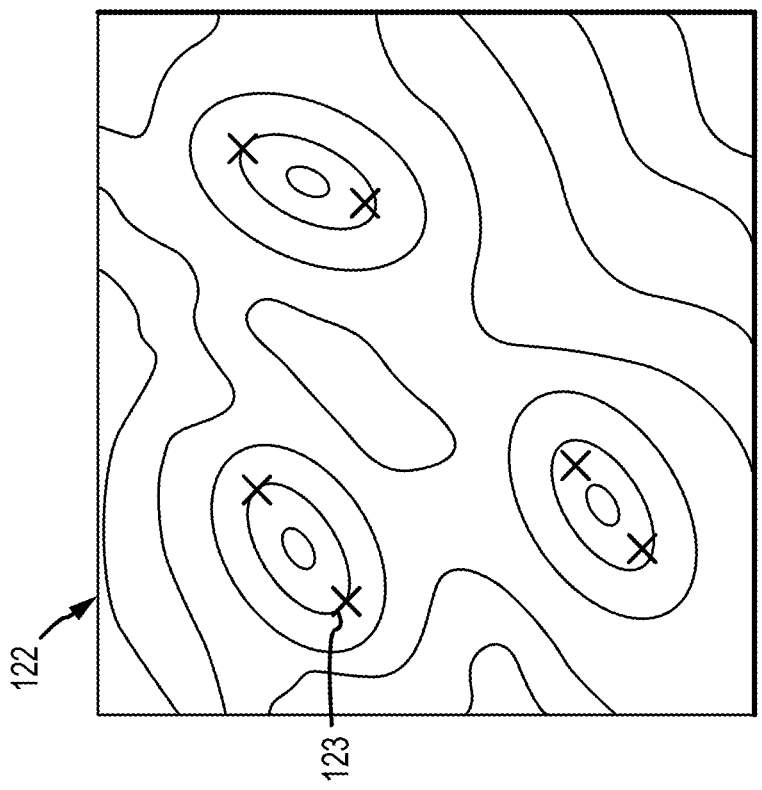
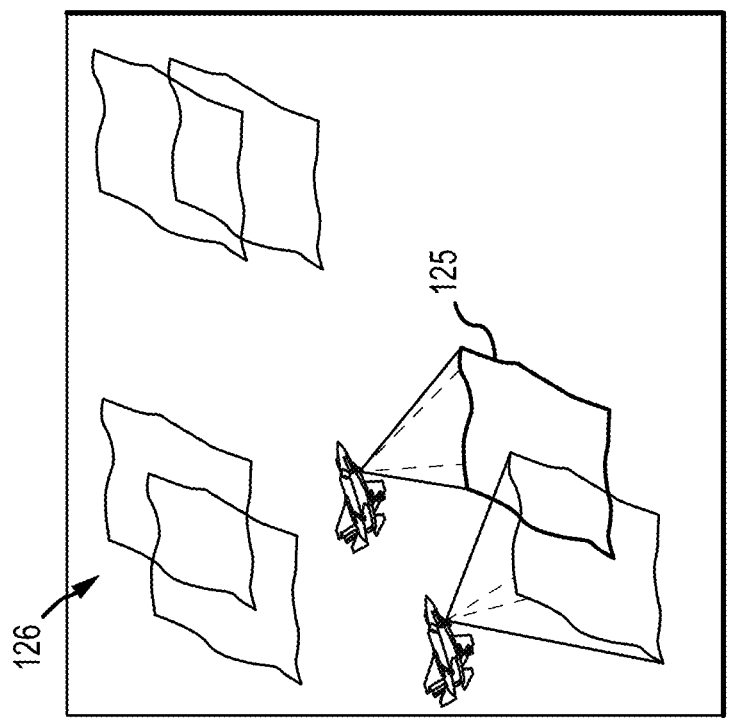
FIG.5a
FIG.5b

IMAGE GEO-REGISTRATION FOR ABSOLUTE NAVIGATION AIDING USING UNCERTAINY INFORMATION FROM THE ON-BOARD NAVIGATION SYSTEM

BACKGROUND OF THE INVENTION

Field of the Invention

This invention relates to image aided navigation and more particularly to the use of image geo-registration to provide absolute position and attitude updates for the on-board navigation system in air, land or underwater vehicles.

Description of the Related Art

Inertial navigation systems (INS) are used to estimate a manned or unmanned air, ground or underwater vehicle's three-dimensional position and attitude states with sufficient accuracy that the vehicle is able to successfully prosecute its mission. INS is particularly needed in GPS-denied (or degraded) environments. The INS consists of an inertial measurement unit (IMU) and possibly one or multiple external aiding devices. The IMU is composed of accelerometers and gyroscopes that measure the specific forces and angular rates applied to the vehicle, respectively. The INS integrates the specific forces and angular rates measured by the IMU to produce a navigation solution, i.e. an estimate of the vehicle's three-dimensional position and attitude. In addition to computing the vehicle's states, the INS also estimates the uncertainty in its navigation solution.

The INS is able to estimate this uncertainty because it is provided with a model of the IMU, i.e. it has an understanding of the quality of the IMU measurements. The navigation uncertainty can be modeled as a probability density function (PDF). A Gaussian or normal distribution is often assumed, in which case the PDF is completely defined by a mean and covariance matrix. Because of inaccuracies in the IMU measurements, error is introduced into the navigation solution. This error grows unbounded over time unless corrected by an external aiding device. An external aiding device provides a periodic measurement of one or more of the position and/or attitude states. Using the measurements generated by an external aiding device, the INS corrects out error in its navigation solution and updates its uncertainty information. A prediction filter is used to both propagate the navigation solution and uncertainty information between measurements from external aiding devices and to incorporate these measurements when they become available. Commonly used examples of prediction filters include the Kalman filter and its derivatives (extended, unscented, etc.) and the particle filter.

Image aided navigation is generally speaking, a class of external aiding devices in which imagery captured from onboard the vehicle (hereafter referred to as sensor imagery) is used to generate position or attitude measurements for use in an INS. Image aided navigation can be divided into relative aiding methods and absolute aiding methods. Relative aiding methods seek to reduce the growth rate of IMU-induced errors in the navigation solution. Absolute aiding methods seek to provide an absolute position and/or attitude measurement that is used in the INS's prediction filter to remove previously accumulated error in the navigation solution. Image geo-registration is an absolute aiding method in which sensor imagery is matched to previously captured reference imagery. The reference imagery is often generated from aerial or satellite sources. The absolute location of the reference imagery is very accurately known. The absolute position and attitude of the vehicle is then estimated from how the sensor imagery 10 matches up or aligns with the reference imagery 12 as shown in FIG. 1. The sensor and reference imagery are matched based on visual features the two images have in common.

The Digital Scene Matching Area Correlator (DSMAC) is one example of image aided navigation based on the principles of image geo-registration. See Jon R. Carr, James S. Sobek, "Digital Scene Matching Area Correlator (DSMAC)", Proc. SPIE 0238, Image Processing for Missile Guidance, (23 Dec. 1980). DSMAC was developed for and is implemented on the Tomahawk cruise missile. In DSMAC, a television camera sensor is fixed in the roll and pitch axes of the vehicle. The missile is commanded to fly level such that the imagery is nadir, or downward pointing. The sensor is gimbaled such that it can be rotated about the yaw axis of the vehicle and its focal length can be adjusted; these degrees of freedom are used to compensate for deviations in heading and altitude from the pre-planned trajectory. The captured imagery is reduced to one bit imagery (i.e., black and white imagery) and is then correlated to reference maps generated during mission planning. The range and cross range extent of the reference maps is governed by navigation uncertainties determined beforehand via computer simulations during mission planning. If the correlation peaks are consistent across multiple sensor images and reference maps, DSMAC produces a horizontal position measurement. The major limitations of DSMAC are the time- and labor-intensive preparation of the reference maps, strict constraints on the mission trajectory (the vehicle must closely execute the pre-planned mission and must maintain level flight while imaging because the DSMAC system can only compensate for changes in heading and altitude), and that only a horizontal position estimate is generated.

Image aided navigation is analogous to terrain aided navigation in many respects, the primary difference being that terrain aided navigation relies on unique terrain or elevation features to find correspondences, as opposed to visual features. Terrain Contour Matching (TERCOM) is an example of terrain aided navigation, also developed for and implemented on the Tomahawk cruise missile. As described in U.S. Pat. No. 9,404,754 for Autonomous Range-Only Terrain Aided Navigation (AROTAN), TERCOM "uses radar altimeter measurements to compute a history of terrain heights and correlates that history with terrain heights from a database map". "The main limitation of TERCOM is the labor-intensive preparation to tailor a set of terrain maps for each mission. The map height grid points, or cells, are aligned with the downtrack/crosstrack direction of a predetermined flight path and the spacing of the cells is the same as the spacing of the measurements with little angling or spacing discrepancy allowed".

An approach to image geo-registration is described by the work of M. D. Pritt and K. J. LaTourette, "Aircraft Navigation by Means of Image Registration," 2013 IEEE Applied Imagery Pattern Recognition Workshop (AIPR), Washington, D.C., 2014, pp 1-6. Ortho-rectification transforms or projects the sensor and reference imagery into a common matching space. Examples of this step include projecting the sensor imagery onto the ground plane or a digital elevation map (DEM) surface, or alternatively, projecting the reference imagery into the sensor's imaging plane. Other pre-processing might occur at this step; for example, because Pritt and LaTourette register the sensor imagery with DEMs, they pre-process the DEMs to simulate illumination effects that might be present in the sensor imagery, such as shadowing, in order to facilitate matching with the sensor image. A sensor model is required for ortho-rectification. The sensor model characterizes how each pixel in the sensor image projects out into the real world. The ortho-rectification also requires an estimate of the vehicle's navigation state, provided by an INS.

A "correlation" is performed to find a set of matching or correlated tie points between the ortho-rectified sensor and reference images. This could be accomplished using any number of image feature descriptors (e.g. SIFT, SURF) or by dividing the images into smaller tiles and correlating each tile pair, such as the process used in U.S. Pat. No. 5,550,937. Area-based correlation techniques such as normalized gradient correlation, phase correlation, or normalized cross correlation are often preferable to feature-based techniques because they offer additional robustness when correlating imagery from different modalities (e.g. electro-optical, infrared, acoustic, synthetic aperture radar (SAR)). The matching tie points consist of the known absolute location of a feature point (usually in geodetic or Earth-centered Earth-fixed (ECEF) coordinates) as derived from the reference imagery, and the corresponding image plane location of that feature (usually in row/column pixel coordinates) as derived from the sensor image.

"Image alignment" brings the matching tie points into alignment. This also accomplishes bringing the images themselves into alignment. This is commonly performed with a "solver", in which the cost function to be minimized is calculated by back projecting the known absolute locations of the matching tie points into the image plane via the sensor model's transforms, computing the residuals between these back projected locations and the known image plane coordinates of the matching tie points, and summing these residuals (or the square of these residuals). In this way, the image geo-registration is reduced to a least squares problem for the solver. The solver seeks to minimize the cost function and consequently align or register the images by adjusting the position and attitude of the vehicle. The solver is seeded with the INS's navigation solution. In Pritt and LaTourette's work, the roll and pitch of the vehicle are assumed to be known within some tight error bounds, thus reducing the number of degrees of freedom in the search space from six to four. They assert that this assumption removes the negative effects of ambiguities between movement in the cross track position and changes in roll, and movement in the down track position and changes in pitch. The optimized result, i.e. the vehicle position and attitude that most closely aligns the set of matching tie points, serves as the measurement to the INS. In this way, the position and/or attitude measurement is deduced by or "drops out" as a result of the registration process. Because the registration is formulated as a least squares problem, it is straightforward to compute the covariance of the position and/or attitude measurement by using the Jacobians of those parameters evaluated at the optimization solution.

Two major limitations are immediately apparent in the prior art as exemplified by the work of Pritt and LaTourette. The first limitation is an inability to handle large navigation errors such as those that might accumulate when flying in a GPS-denied/degraded environment for an extended period of time. If the ortho-rectification is performed using highly corrupted position and attitude states from the INS, the correlation step will be unable to find matches as the ortho-rectified sensor and reference imagery will be from two significantly different perspectives. Additionally, when significant navigation error is present, optical distortions due to elevation changes in the sensor image (such as foreshortening) are incorrectly compensated for during ortho-rectification, thus further complicating the correlation step. The second limitation is that roll and pitch must be known to a high degree of accuracy (this is fundamentally the same limitation observed in the DSMAC system). Because roll and pitch are assumed to be known, it follows that the prior art is unable to estimate roll and pitch and provide these measurements to the INS.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention relates to image aided navigation and more particularly to the use of image geo-registration to provide absolute position and attitude updates for the on-board navigation system. The uncertainty distribution associated with the state estimate output by the INS is fed back and incorporated into the method of image geo-registration. This allows the image geo-registration system to handle larger navigation errors, provide a full six degree of freedom position and attitude absolute navigation update for the navigation system and provide a more accurate update. Generating the update simultaneously for multiple images may provide a more robust solution to address any observability issues that may be present, the ability to fuse different sensor modalities and in general more accurate updates. Key frames may be used to improve the computational efficiency of the method.

In an embodiment, a system or method of image geo-registration provides absolute position and attitude updates and measurement uncertainty distribution to a navigation system that includes an inertial measurement unit (IMU), a prediction filter, a sensor for collecting sensor images, a reference image database and a 3-D scene model database. A state estimate of position, velocity and attitude with its uncertainty distribution is fed back from the INS prediction filter to reference and sensor image projectors to generate based on a 3-D scene model a projected reference image and a plurality of candidate sensor model transforms and their resulting projected sensor images in a common image space using samples drawn from the uncertainty distribution of the state estimate. The candidate projected sensor images are correlated to the projected reference imagery to select one of the candidate sensor models. A set of matching tie points are generated between the selected projected sensor image and the reference image. The state estimate with its uncertainty distribution is also fed back to a sensor model parameter solver that solves a constrained optimization problem in which the uncertainty distribution shapes the topology of a search space by scoring the sensor model solutions and penalizes low probability solutions to guide the solver to a solution that provides full six degree-of-freedom absolute position and attitude updates for the navigation system.

In an embodiment, the system or method is used to provide autonomous navigation for an air, land or underwater vehicle. For aerial or underwater vehicles, the 3-D scene model database may be a digital elevation database of the ground or ocean floor, respectively. For a land vehicle, the 3-D scene model database may be a point cloud depth map database.

In an embodiment, the sensor and reference images are projected using an ortho-rectification process.

In an embodiment, the uncertainty distribution of the state estimate is used to define a sensor image footprint to determine the extent of reference imagery to extract from the reference image database and provide to the reference image projector.

In an embodiment, the tie points comprise the absolute coordinates (latitude/longitude/attitude) and the sensor image pixel coordinates (row/column) of visual features common to both the projected reference and sensor images.

In an embodiment, the sensor model solver scores potential absolute position and attitude updates based upon their likelihood according to the uncertainty distribution of the state estimate and incorporates the score into the solver's cost function such that the topology of the search space is constrained to within a certain bounds and, within those bounds, shaped to prioritize higher probability regions to guide the solver to the solution. The solver performs the following four steps in an iterative manner to align the images and generate the solution; (1) back-projecting the known real-world coordinates of the matching tie points into the image plane via the sensor model's world-to-image transform and computing the sum of the squared residuals between the back-projected locations and the known image plane coordinates to form the basis of the cost function; (2) computing a penalty based on the current sensor model's likelihood of occurring according to the uncertainty distribution of the state estimate; (3) computing the gradient of the cost function with respect to position and attitude; and (4) using the gradient to find a step in the position and attitude that decreases the value of the cost function.

In an embodiment, multiple sensors of the same or different modalities generate multiple sensor images. Each sensor image is used to generate a set of candidate images that are projected into the common space with the reference image. Each set of projected candidate images is correlated with the reference image to select one of the candidate sensor models. The selected sensor model from each image is used to generate a set of tie points, resulting in a unique set of tie points from each sensor image. The sensor model parameter solver performs the constrained optimization of the sensor model simultaneously on the multiple sets of tie points to generate a single full six degree-of-freedom absolute position and attitude update.

In an embodiment, the projected sensor image is initialized as a key frame image and is correlated to the projected reference image to produce a set of key frame features. Between key frame initializations, features are extracted from sensor images and tracked against the key frame or the previous frame to generate tie points upon which the constrained optimization of the sensor model is performed to generate the updates.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1, as described above, is a diagram of image geo-registration for absolute navigation aiding;

FIGS. 5a and 5b illustrate the generation and the selection of one candidate sensor model transform using the uncertainty information;

DETAILED DESCRIPTION OF THE INVENTION

The present invention describes a technique for feeding back and incorporating the uncertainty distribution of the state estimate output by the INS in the image geo-registration process to handle larger navigation errors, provide a full six degree of freedom position and attitude absolute navigation update for the navigation system and provide a more accurate update. Generating the update simultaneously for multiple images may provide a more robust solution to address any observability issues that may be present, the ability to fuse different sensor modalities and in general more accurate updates. Key frames may be used to improve the computational efficiency of the method.

The image geo-registration process may be used in aerial, land and underwater vehicles and is of particular use for autonomous navigation of such vehicles. Autonomous navigation may be used for unmanned vehicles or to provide an "auto pilot" mode for manned vehicles.

Figure 2:
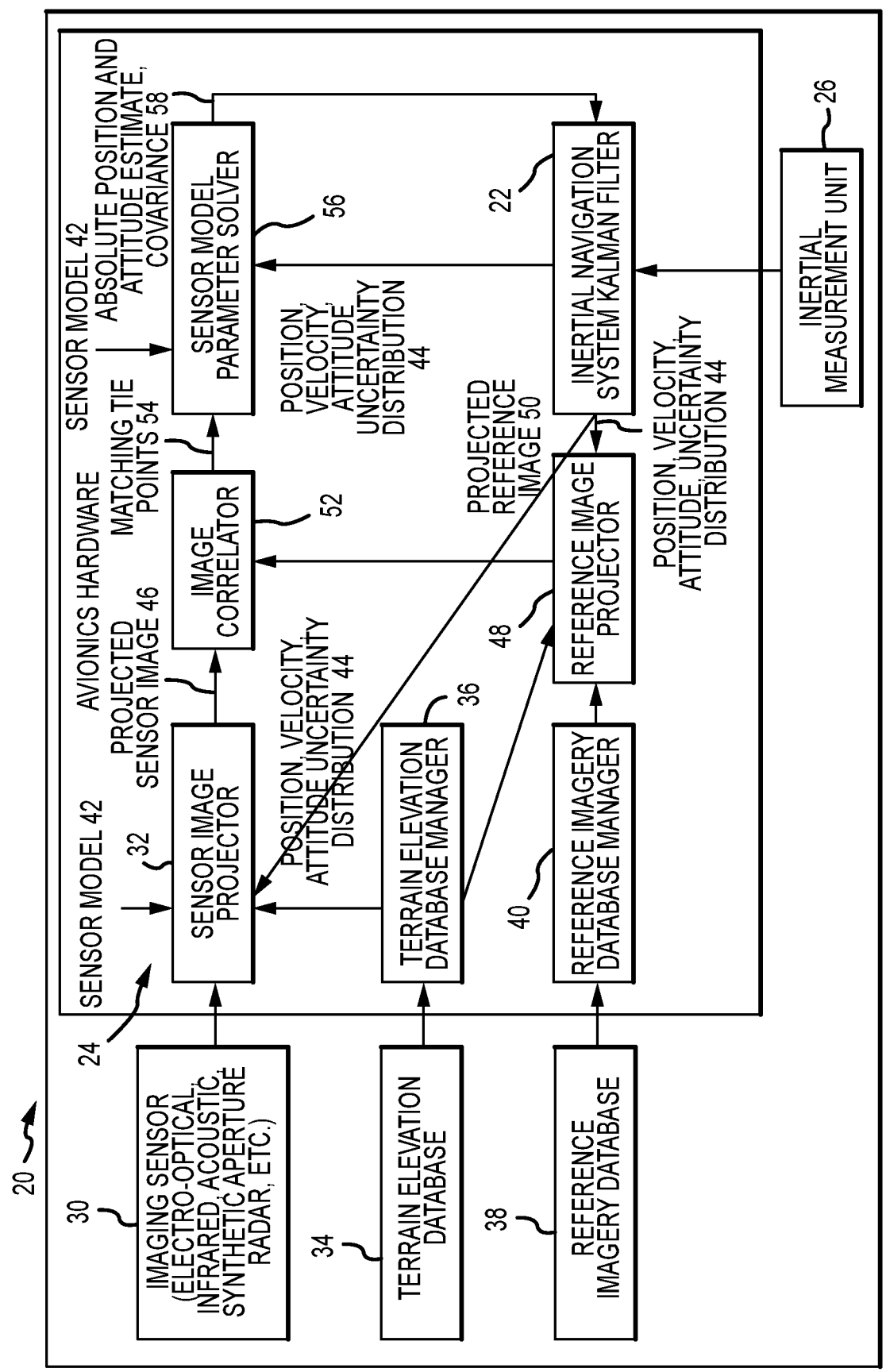
FIG. 2 is a block diagram of an image aided navigation system in accordance with an embodiment of the present invention.
Figure 3A:
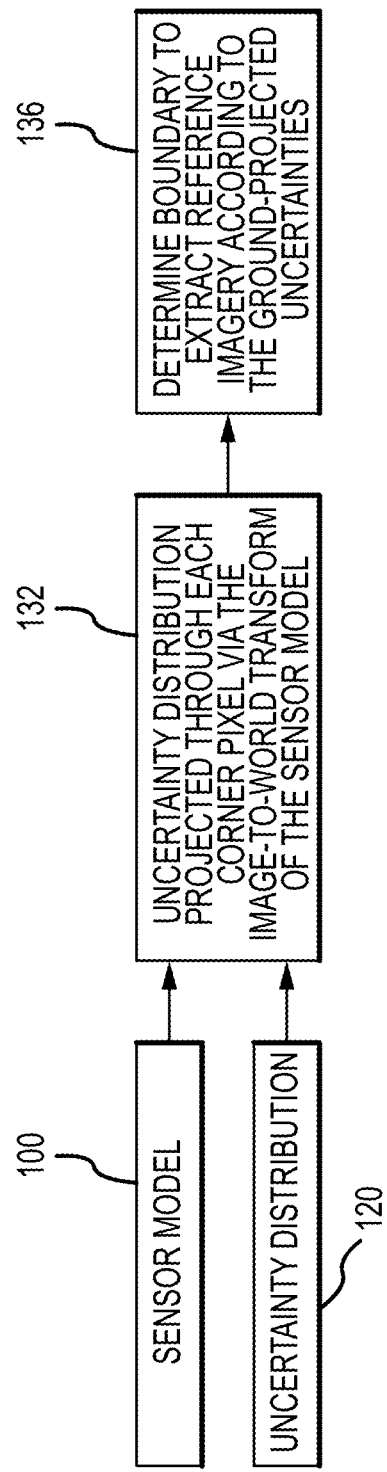
FIGS. 3a and 3b are block diagrams of exemplary sensor and reference image ortho-rectification processes using uncertainty information from the on-board navigation system, respectively.
Figure 3B:
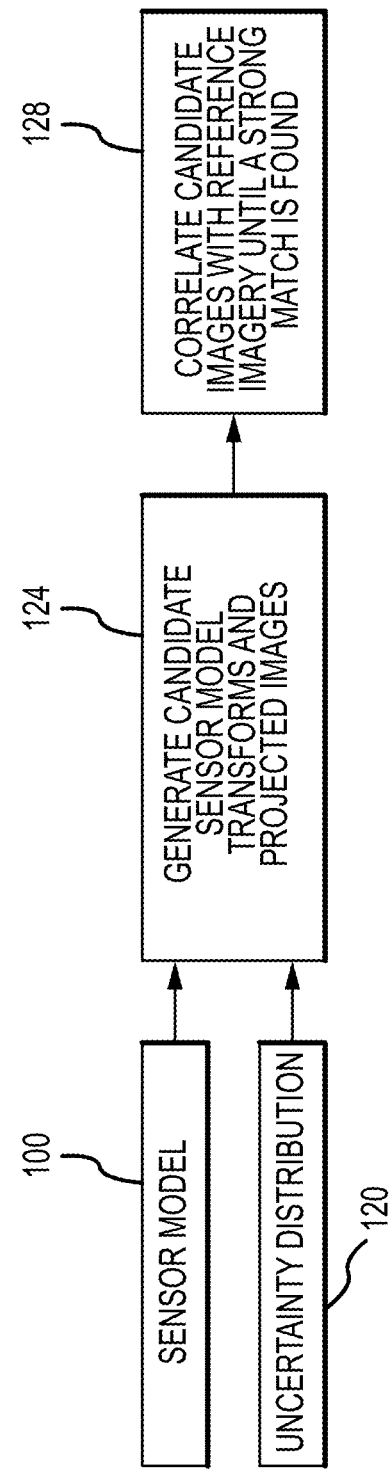

As depicted in FIG. 2, an embodiment of an image aided navigation system 20 for an aerial vehicle includes an inertial navigation system (INS) 22 with a prediction filter (e.g. a Kalman filter) and an image geo-registration system 24. The INS 22 integrates the specific forces and angular rates measured by an Inertial Measurement Unit (IMU) 26 to produce a navigation solution, i.e. an estimate of the vehicle's three-dimensional position and attitude. In addition to computing the vehicle's states, the INS also estimates the uncertainty in its navigation solution, often in the form of a covariance matrix. Image geo-registration system 24 ingests sensor imagery, projects the sensor imagery into a common space to facilitate correlation with reference imagery, identifies matching tie points between the sensor and reference imagery, and brings the matching tie points into alignment via the sensor model parameter solver. In the process of aligning the tie points, the sensor model parameter solver also generates a position/attitude measurement and covariance that are incorporated in the INS's prediction filter to remove previously accumulated error in the navigation solution.

In accordance with the invention, the uncertainty distribution generated by the INS's prediction filter is fed back and incorporated in the image geo-registration system 24. The uncertainty distribution associated with the state estimate output by the INS is fed back and incorporated into the method of image geo-registration. This allows the image geo-registration system to handle larger navigation errors, provide a full six degree of freedom position and attitude absolute navigation update for the navigation system and provide a more accurate update. Generating the update simultaneously for multiple images may provide a more robust solution to address any observability issues that may be present, the ability to fuse different sensor modalities and in general more accurate updates. Key frames may be used to improve the computational efficiency of the method.

An Imaging Sensor 30 includes one or more sensors of various different modalities e.g. electro-optical (EO), infra-red (IR), acoustic, Synthetic Aperture Radar (SAR), etc. The Imaging Sensor's function is to capture imagery at some periodic rate and send the imagery along with any relevant metadata, such as camera gimbal angles, to a "Sensor Image Projector" 32.

A Terrain Elevation Database 34 contains a database of digital elevation files that provide a 3-D scene model of the ground. Each digital elevation file is accompanied with metadata detailing the geographic bounds, coordinate frame, and resolution of the data. This database is used by a Terrain Elevation Database Manager 36, which is responsible for efficiently managing the computer memory allocated for the Terrain Elevation Database 34. Manager 36 maintains a compact mathematical description of each elevation file and loads them into memory when necessary.

A Reference Imagery Database 38 contains a database of geo-referenceable imagery. This imagery is usually obtained from aerial or satellite sources and is accompanied with metadata detailing the geographic bounds, coordinate frame, and resolution of the imagery. This database is used by a Reference Imagery Database Manager 40, which is responsible for efficiently managing the computer memory allocated for the Reference Imagery Database. Manager 40 maintains a compact mathematical description of each reference image and loads them into memory when necessary.

Figure 4A:
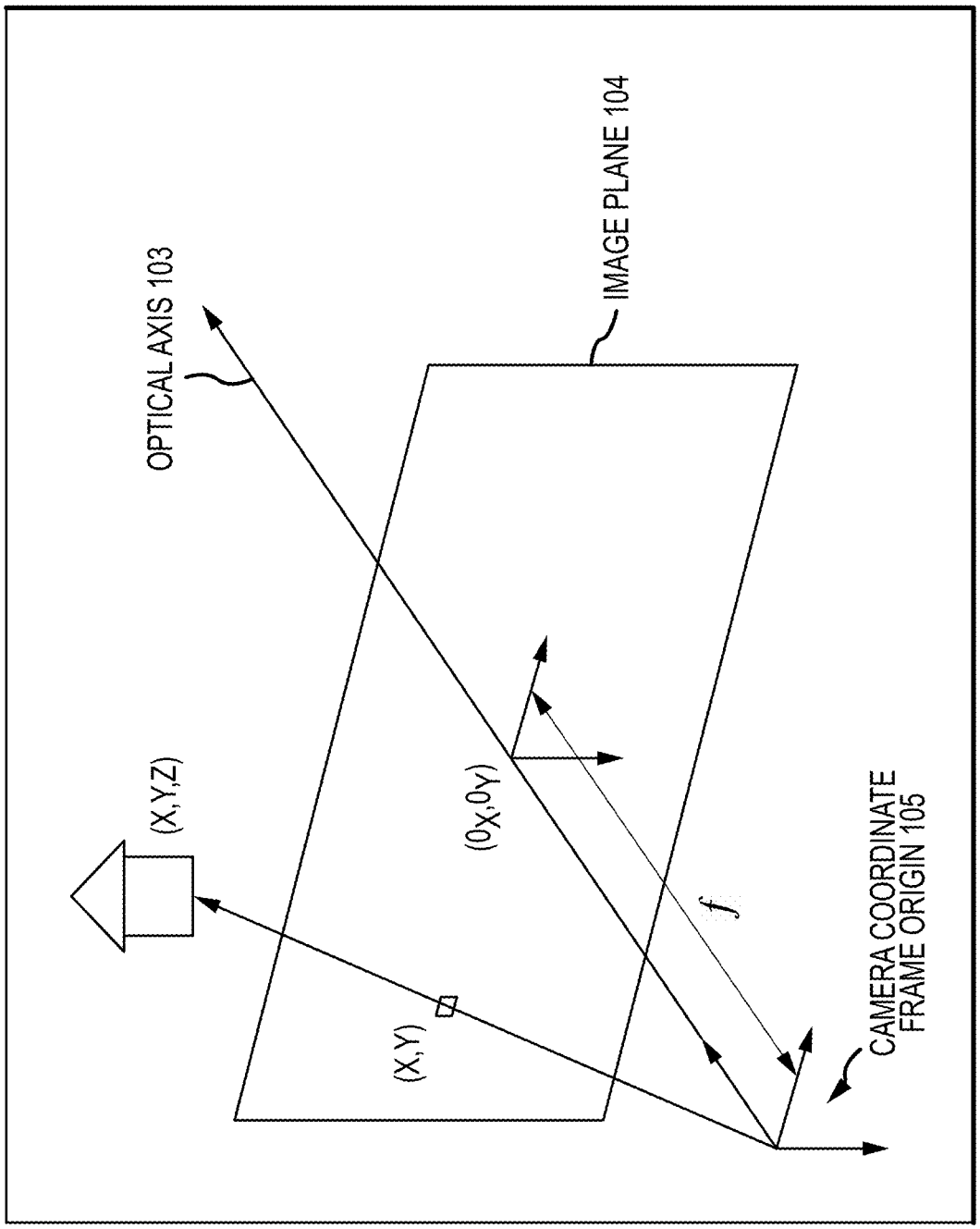
FIGS. 4a and 4b are illustrations of embodiments of a pinhole camera model and of a synthetic aperture radar (SAR) sensor model, respectively.
Figure 4B:
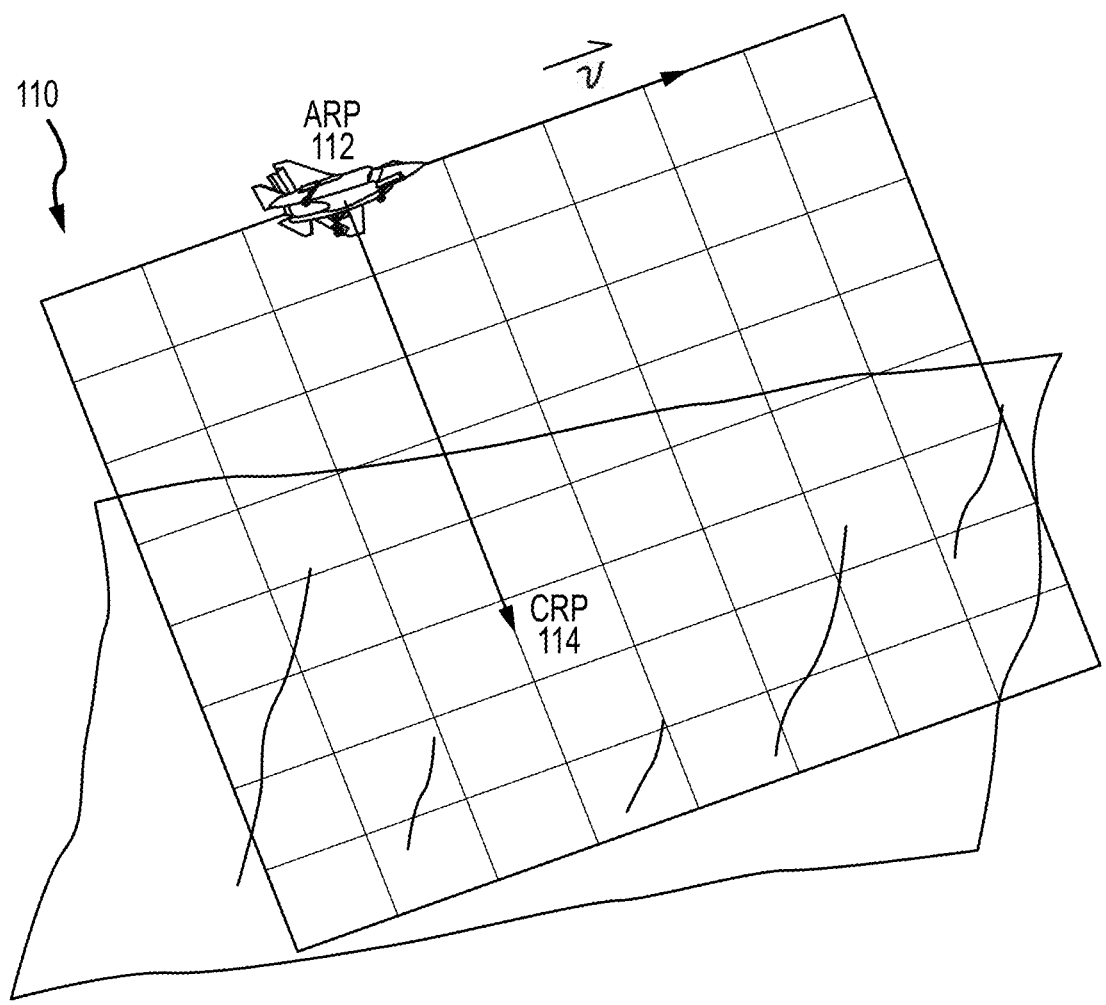

The Sensor Image Projector 32 ingests the sensor image and relevant digital elevation files in order to project the sensor image into a common image space. In an embodiment for either an aerial or underwater vehicle, ortho-rectification is the process of projecting an image onto a digital elevation surface to create a vertical view of the image that is free from distortions. This is generally accomplished by discretizing the digital elevation surface, back-projecting each discretization point into the image plane, and assigning each discretization point the corresponding pixel value in order to form an image. In an embodiment for an autonomous vehicle, this projection might be accomplished by performing ray-tracing operations for each pixel out into the real world to determine where the ray intersects the scene to form point cloud depth map. Projection requires a sensor model 42 that describes the imaging geometry of the sensor; this model contains the mathematical transforms to go between image space and real world space (see FIGS. 4a and 4b for examples). Constructing a sensor model requires an estimate 44 of the vehicle's position/velocity/attitude (PVA), which is provided by the INS 22. The INS also provides an uncertainty distribution (e.g. a covariance matrix) on its estimate 44. By drawing samples from the uncertainty distribution, the Sensor Image Projector 32 generates several candidate sensor models and produces a candidate projected sensor image 46 for each candidate sensor model (see FIGS. 5a and 5b).

Figure 6:
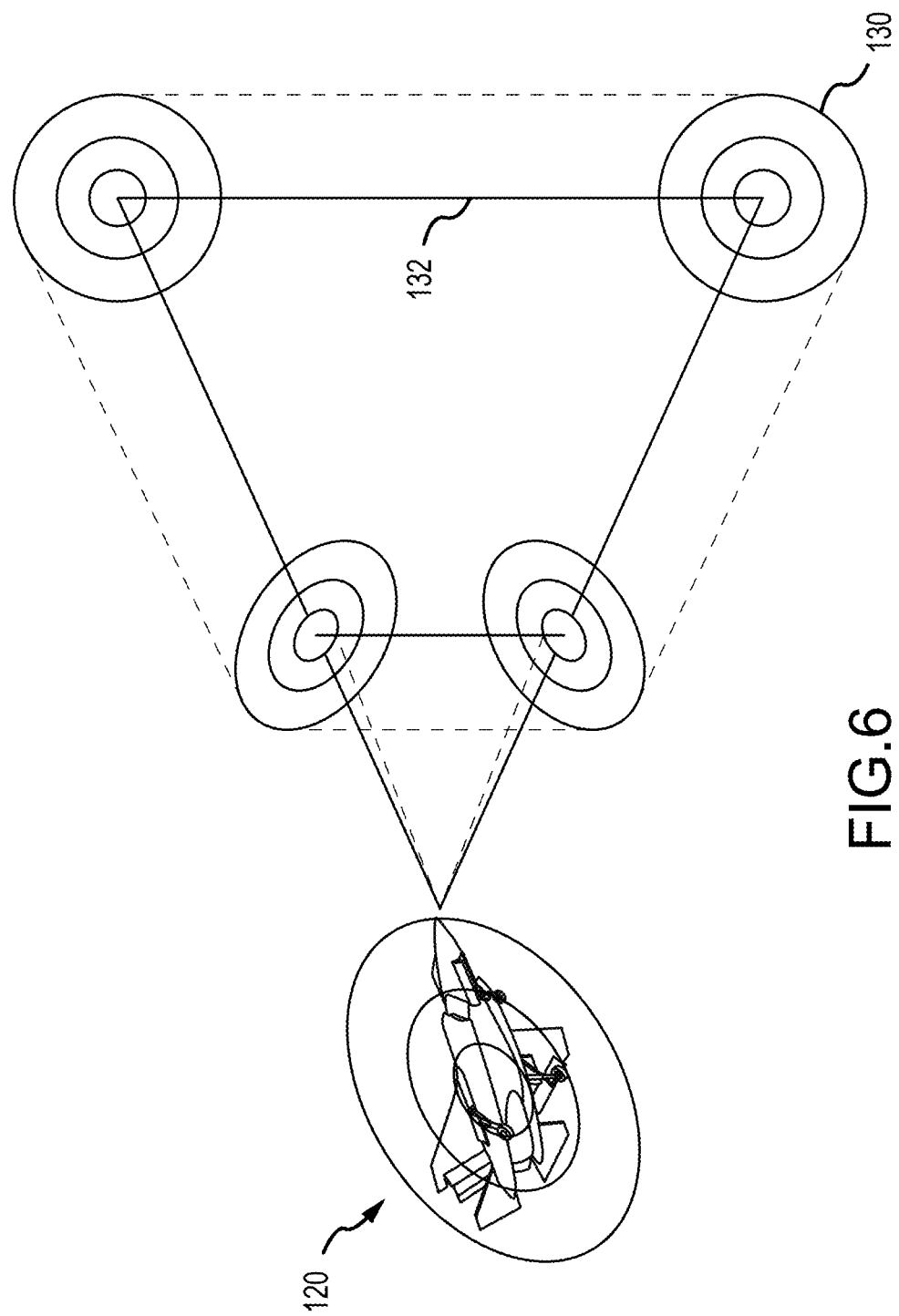
FIG. 6 illustrate the definition of the extent of the reference image required for registration using the uncertainty information.
Figure 7:
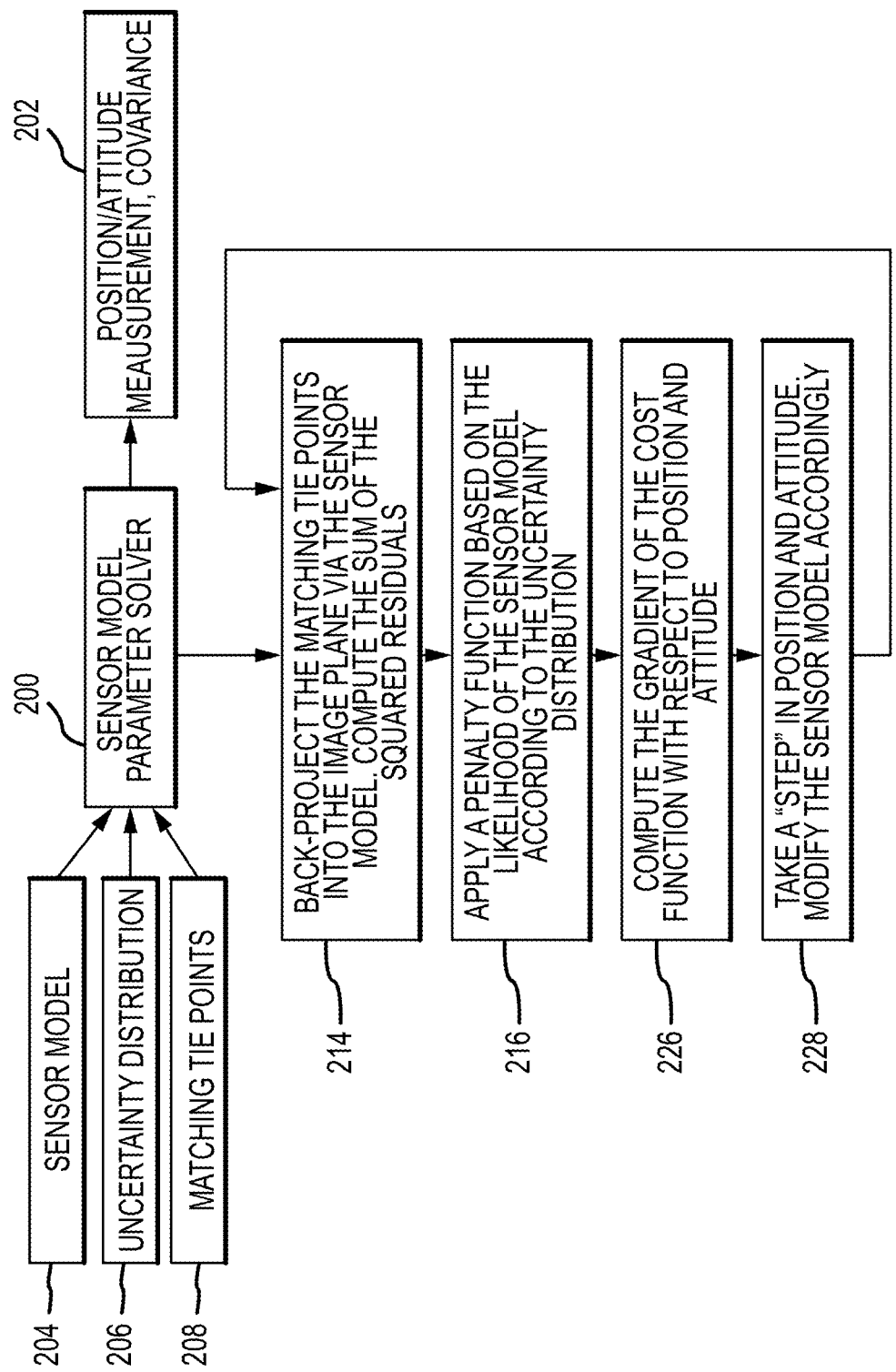
FIG. 7 is a block diagram of an exemplary sensor model parameter solver using the uncertainty information.

A Reference Image Projector 48 produces a projected reference image 50 that is used to correlate to the projected sensor image 46. In an embodiment for either aerial or underwater vehicles, ortho-rectification is used to project the image. The Projector 48 computes the probabilistic bounds of the sensor image footprint on the ground using the uncertainty distribution provided by the INS (see FIG. 6). Depending on the size and location of the sensor image footprint, multiple reference images might be required to create the projected reference image necessary for correlation. Projector 48 is responsible for stitching those images together. Some reference imagery sources require elevation information in order to be ortho-rectified; this information is provided by the Terrain Elevation Database Manager 36.

An Image Correlator 52 ingests the projected reference image 50 and the series of candidate projected sensor images 46. Each candidate projected sensor image is correlated with the projected reference image until a strong candidate is found. The strength of the candidates might be measured by the peak signal-to-noise ratio. Once a strong candidate is found, the Image Correlator 52 identifies matching tie points 54 between the projected sensor and reference images. This may be done by sub-dividing the images into tiles and correlating the tile pairs or by using an image feature descriptor.

Figure 8:
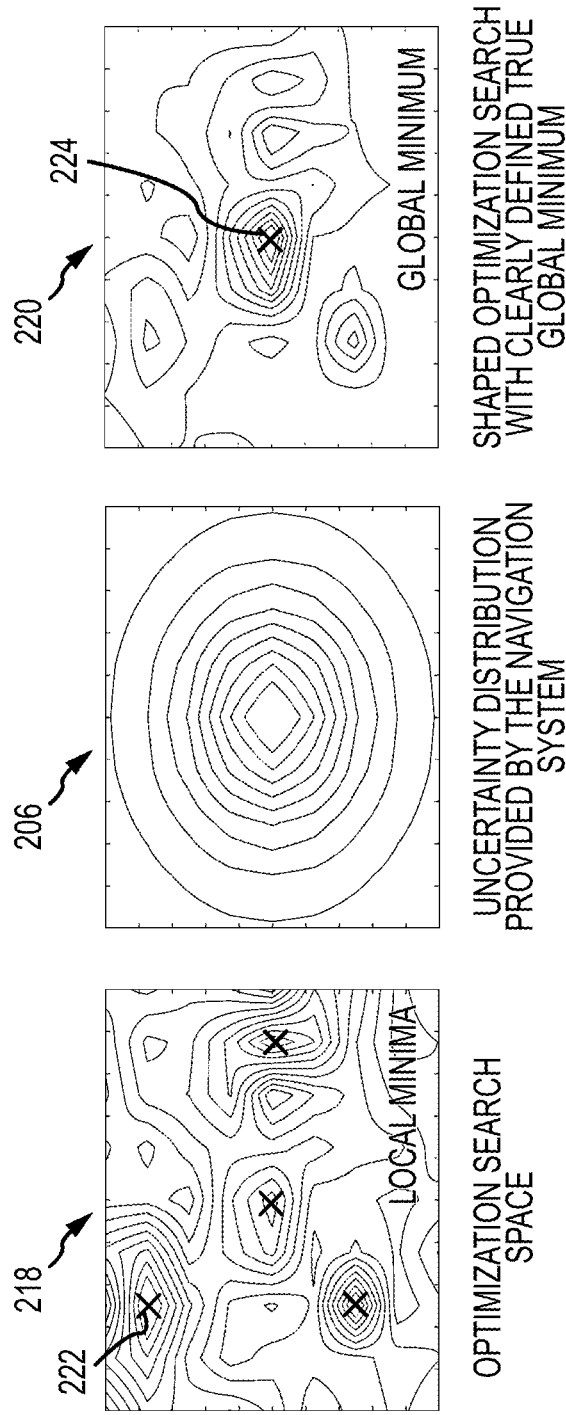
FIGS. 8a-8c illustrate the shaping of the parameter search space using the uncertainty information to clearly define a solution.
Figure 9:
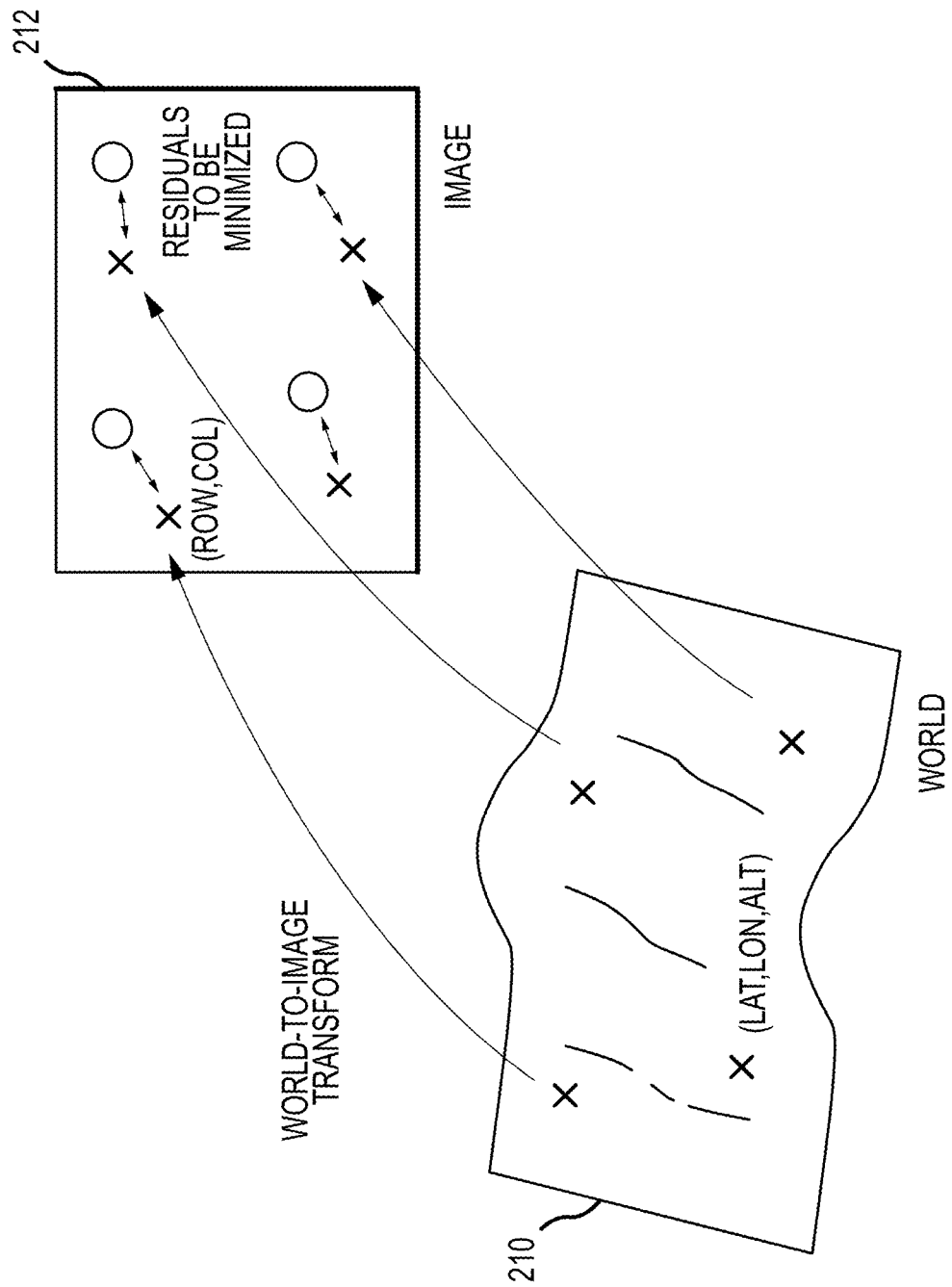
FIG. 9 illustrates an embodiment of a cost function calculation of the shaped search space for the sensor model parameter solver.

A Sensor Model Parameter Solver 56 ingests the matching tie points 54 generated by the Image Correlator and uses an iterative routine to bring the tie points into alignment. This solver makes a series of adjustments to the vehicle's position/velocity/attitude. These adjustments modify the world-to-image transform of the sensor model such that the real world coordinates of the matching tie points back-project to the correct image plane locations (see FIG. 9). At each step of the iterative routine, the likelihood of the current position/velocity/attitude solution is evaluated according to the INS's uncertainty distribution. The solver then applies a penalty to the cost function of the iterative routine based on that likelihood. This effectively changes the topology of the solver's search space (see FIG. 8). The solver outputs a full six degree of freedom (DOF) position/attitude measurement (e.g., x/y/z and roll/pitch/yaw) and covariance 58 that provides the absolute update for the INS 22.

The Inertial Navigation System 22 ingests the image geo-registration measurement and covariance 58 and incorporates that measurement into its navigation solution via a Kalman filter, or some other prediction filter used for data fusion. The INS also ingests measurements from the IMU 26, which it uses to propagate its navigation solution between image geo-registration measurements. The INS outputs its current position/velocity/attitude solution and associated uncertainty distribution 44 to various blocks in the system. The Inertial Measurement Unit 26 includes accelerometers and gyroscopes that measure the specific forces and angular rates applied to the vehicle.

Referring now to FIGS. 3a-3b, 4a-4b, 5a-5b and 6, a sensor model 100, in its most generic sense, describes the imaging geometry of the sensor. As such, it describes the image-to-world and world-to-image mathematical transforms. These transforms are functions of the vehicle's position/velocity/attitude and can be stated as such:

Image-to-world:

$$\begin{bmatrix} X_w \\ Y_w \\ Z_w \end{bmatrix} = f\left( \begin{bmatrix} X_i \\ Y_i \end{bmatrix}, \begin{bmatrix} P_x \\ P_y \\ P_z \end{bmatrix}, \begin{bmatrix} V_x \\ V_y \\ V_z \end{bmatrix}, \begin{bmatrix} A_\phi \\ A_\theta \\ A_\psi \end{bmatrix}, \text{other parameters} \right)_{i \to w} \quad (1)$$

World-to-image:

$$\begin{bmatrix} X_i \\ Y_i \end{bmatrix} = f\left( \begin{bmatrix} X_w \\ Y_w \\ Z_w \end{bmatrix}, \begin{bmatrix} P_x \\ P_y \\ P_z \end{bmatrix}, \begin{bmatrix} V_x \\ V_y \\ V_z \end{bmatrix}, \begin{bmatrix} A_\phi \\ A_\theta \\ A_\psi \end{bmatrix}, \text{other parameters} \right)_{w \to i} \quad (2)$$

In the above equations, the subscript i denotes image space, the subscript w denotes world space, and P, V, A are the position/velocity/attitude of the vehicle.

Pinhole Camera Sensor Model

A pinhole camera model 102 (see FIG. 4*a*) can be used to model electro-optical (EO) or infrared (IR) cameras. A camera matrix is constructed that encodes the internal camera geometry:

$$K = \begin{bmatrix} f & 0 & o_x & 0 \\ 0 & f & o_y & 0 \\ 0 & 0 & 1 & 0 \end{bmatrix} \quad (3)$$

In the above equation, f represents the camera focal length and $o_x, o_y$ represent the optical center of the camera. The camera matrix defines the optical axis 103 or boresight of the camera and the location of the image plane 104 where the image is formed. In the case of a calibrated camera, the camera matrix includes off-diagonal elements that model the camera's distortion. The camera matrix can be applied to a point in the real world to obtain its projection onto the image plane:

$$\begin{bmatrix} \lambda x_i \\ \lambda y_i \\ \lambda z_i \end{bmatrix} = K \begin{bmatrix} X'_w \\ Y'_w \\ Z'_w \\ 1 \end{bmatrix} \quad (4)$$

The properly scaled pixel coordinates can be obtained by dividing by λ. Before applying the camera matrix, the real world point needs to be expressed in the image coordinate frame. This is done by subtracting off the vehicle position and performing a series of rotations from world frame to body frame, body frame to camera frame, and camera frame to image frame:

$$\begin{bmatrix} X'_w \\ Y'_w \\ Z'_w \end{bmatrix} = R_i^c R_c^b R_b^w K \begin{bmatrix} X_w - P_x \\ Y_w - P_y \\ Z_w - P_z \end{bmatrix} \quad (5)$$

The vehicle position is related to the camera coordinate frame origin 105 by a static lever arm distance or can be assumed to be co-located. The world-to-body rotation matrix is a function of the vehicle attitude:

$$R_b^w = f(A_\phi, A_\theta, A_\psi) \quad (6)$$

Thus in the example of the pinhole camera model, it becomes readily apparent that the sensor model is a function of vehicle position and attitude.

Synthetic Aperture Radar Sensor Model

A synthetic aperture radar (SAR) model 110 (see FIG. 4*b*) is a function of the vehicle position and velocity at the aperture reference point (ARP) 112 and the position of the central reference point (CRP) 114, most conveniently expressed in a local-level coordinate frame:

$$R_{ARP} = \begin{bmatrix} P_{ARP_x} \\ P_{ARP_y} \\ P_{ARP_z} \end{bmatrix}, V_{ARP} = \begin{bmatrix} V_{ARP_x} \\ V_{ARP_y} \\ V_{ARP_z} \end{bmatrix}, R_{CRP} = \begin{bmatrix} P_{CRP_x} \\ P_{CRP_y} \\ P_{CRP_z} \end{bmatrix} \quad (7)$$

The vehicle attitude is embedded in the relationship between the vehicle position at the ARP and the position of the central reference point. The SAR model is described in W. Wonnacott, "Geolocation with Error Analysis Using Imagery from an Experimental Spotlight SAR", PhD Dissertation, Purdue University, 2008.

The first step in constructing the SAR sensor model is to define the slant plane unit vectors:

$$\vec{r_s} = \frac{R_{CRP} - R_{ARP}}{\|R_{CRP} - R_{ARP}\|} = \frac{r_0}{r_0}, \quad (8)$$

$$\vec{n_s} = k_{LR} \frac{\vec{r_s} \times V_{ARP}}{\|\vec{r_s} - V_{ARP}\|},$$

$$\vec{c_s} = \vec{n_s} \times \vec{r_s}$$

The variable $k_{LR}$ indicates to which side of the vehicle the radar is looking. It is computed by:

$$k_{LR} = \text{sign}\{V_{ARP_y}(P_{CRP_x} - P_{ARP_x}) - V_{ARP_x}(P_{CRP_y} - P_{ARP_y})\} \quad (9)$$

To project a point in the real world $R_G = [x_G \ y_G \ z_G]^T$ into the slant plane, the range and Doppler of the point need to be computed:

$$r = \|r\| = \|R_G - R_{ARP}\|, \ d = \frac{V_{ARP} \cdot r}{r} \quad (10)$$

The equivalent slant image plane coordinates can then be computed:

$$v' = \begin{bmatrix} v'_x \\ v'_y \\ v'_z \end{bmatrix} = [\vec{r_s} \ \vec{c_s} \ \vec{n_s}]^T (R_{ARP} - R_{CRP}), \quad (11)$$

$$V = \|V_{ARP}\|$$

$$x_{p'} = r \frac{d v'_x + k_{LR} v'_y \sqrt{V - d^2}}{V^2} - r_0,$$

$$y_{p'} = r \frac{d v'_y + k_{LR} v'_x \sqrt{V - d^2}}{V^2}$$

The true row and column values can then be computed:

$$\text{row} = \frac{x'_p}{\delta_{row}} + row_{CRP}, \quad col = \frac{y'_p}{\delta_{col}} + col_{CRP} \quad (12)$$

The variables $\delta_{row}, \delta_{col}$ are the row and column resolution of the slant plane and $row_{CRP}, col_{CRP}$ are the pixel positions of the CRP in the slant plane.

In an embodiment, an uncertainty distribution 120 is modeled as a probability density function (PDF). A generic PDF 122 is shown in FIG. 5a. A Gaussian PDF is often assumed, in which case the PDF is characterized by its mean μ and its covariance P. In the INS, the mean computed by the Kalman filter serves as the navigation solution. Qualitatively speaking, the covariance describes the level of confidence the INS has in its solution. The covariance contains the variance of each variable along with the cross-covariance elements between variables:

$$P = \begin{bmatrix} E[(X_1 - \mu_1)(X_1 - \mu_1)] & \cdots & (X_1 - \mu_1)(X_n - \mu_n) \\ \vdots & \ddots & \vdots \\ (X_n - \mu_n)(X_1 - \mu_1) & \cdots & (X_n - \mu_n)(X_n - \mu_n) \end{bmatrix} \quad (13)$$

In known image geo-registration systems, only a single sensor model is generated. The navigation solution is used to generate a sensor model, and a single projected sensor image is produced using this sensor model:

$$SM_\mu = f(\mu) \rightarrow I_\mu \quad (14)$$

In this invention, samples 123 are drawn from the INS's uncertainty distribution to generate a series of candidate sensor models (see FIG. 5a) and projected sensor images 126 (see FIG. 5b). Samples can be drawn randomly; in the case of a Gaussian distribution, a multi-variate normal random number generator can be used. Or, samples can be systematically drawn from the distribution using a method that guarantees more uniform coverage over the probability space, such as Latin hypercube sampling. Either approach will generate a series of deviations from the mean $\Delta_i$. These deviations are used to generate a series of candidate sensor models and ortho-rectified sensor images:

$$SM_0 = f(\mu) \rightarrow I_0 \quad (15)$$
$$SM_1 = f(\mu + \Delta_1) \rightarrow I_1$$
$$SM_2 = f(\mu + \Delta_2) \rightarrow I_2$$
$$\vdots$$
$$SM_n = f(\mu + \Delta_n) \rightarrow I_n$$

In the pre-correlation step 128, the candidate projected sensor images are sequentially correlated with the projected reference image until a strong match is found 125. One way of evaluating the strength of the match is to compute the peak signal-to-noise ratio of the correlation. In a real-time implementation of this system, image $I_1$ would only be produced if image $I_0$ was deemed a poor match, $I_2$ only if $I_1$ was a poor match, and so on.

The ortho-rectified, or more generally projected, reference image must provide sufficient coverage to ensure that the sensor image footprint is contained within the reference image. Conversely, the extent of the reference imagery extracted from the database should be no larger than necessary in order to limit computation time and reduce correlation ambiguities. To do this, the INS's uncertainty distribution 120 can be projected through each corner pixel of the sensor image onto the digital elevation surface or ground plane 130 step 132 (see FIG. 6). One method of doing this is with the unscented transform. In the unscented transform, a set of sigma points is generated such that the sigma points encode the mean and covariance of the distribution. The sigma points are then passed through a given function, in this case the image-to-world transform of the sensor model. The mean and covariance of the transformed sigma points is then computed, which provides an approximation of how the uncertainty distribution itself passes through the transform. The probabilistic bounds of the sensor image footprint are then computed using these ground-projected uncertainties to define the boundary 134 of reference image to be extracted step 136.

Referring now to FIGS. 7, 8a-8c and 9, a sensor model parameter solver 200 iteratively refines the INS's navigation solution such that the matching tie points come into alignment and outputs a full DOF position and attitude with covariance 202 that provides the absolute update for the INS. The solver 200 takes as input the sensor model(s) 204, the uncertainty distribution 206, and the set(s) of matching tie points 208.

Recall that the matching tie points consist of:
1. The known real world coordinates of the visual features. This information is derived from the ortho-rectified reference image.
2. The known image plane coordinates of the visual features. This information is derived from the ortho-rectified sensor image.

The sensor model parameter solver 200 performs the following four steps in an iterative fashion in order to align the images and generate a position/attitude measurement. First, the solver takes the known real-world coordinates 210 of the matching tie points and back projects them into the image plane 212 via the sensor model's world-to-image transform (see FIG. 9) (step 214). The solver then computes the sum of the squared residuals between these back projected locations and the known image plane coordinates; this forms the basis of the cost function:

$$c_k = \sum_{j=1}^{j=n} r_j^2 + f_p, \quad r_j = f_{w \rightarrow i}\left(SM_k, \begin{bmatrix} X_{w_j} \\ Y_{w_j} \\ Z_{w_j} \end{bmatrix}\right) - \begin{bmatrix} X_{i_j} \\ Y_{i_j} \end{bmatrix} \quad (16)$$

In the above function, the subscript k represents the current iteration of the solver, the subscript j is the current tie point being processed, n is the number tie points, the subscript w indicates real world coordinates, the subscript i indicates image plane coordinates, and $r_j$ is the residual of an individual tie point. The choice of this cost function frames the problem in a least squares sense.

The second step 216 of the solver involves computing a penalty based on the current sensor model's likelihood of occurring. In an embodiment, the penalty associated with the likelihood of the sensor model at iteration k can be computed as follows when a Gaussian distribution is assumed. First, the Mahalanobis distance of the sensor model is computed:

$$M = \sqrt{(\mu_k - \mu_0)^T P^{-1} (\mu_k - \mu_0)} \quad (17)$$

The Mahalanobis distance is a multi-variate analog to the single variable standard deviation; it expresses how "far" a given state is from the mean. Note that the Mahalanobis distance evaluates to zero for the nominal sensor model, i.e. when $\mu_k = \mu_0$. The Mahalanobis distance is then used to compute a penalty, which in an embodiment might take the form of:

$$f_P = c_0 \left(\frac{M}{\beta}\right)^\alpha \tag{18}$$

In the above equation, $c_0$ is the sum of the squared residuals evaluated at the nominal sensor model $SM_\mu$, $\beta$ is a parameter that bounds how far the solver's solution is allowed to deviate from the INS's solution, and $\alpha$ is a parameter that governs the shape of the penalty function; larger values result in a penalty function that is very gentle close to the mean and quickly becomes very steep as $M \to \beta$, whereas smaller values result in larger penalties closer to the mean and less rapid growth as $M \to \beta$. Note that the cost function is designed such that it should never exceed $c_0$.

The penalty function based on the uncertainty distribution 206 in FIG. 8b has the effect of transforming a search space 218 in FIG. 8a into the search space 220 of FIG. 8c. The penalty function has a smoothing effect on the search space, and this effect is more pronounced at greater distances from the mean. Thus, given multiple similarly-valued solutions 222, the solver will select the one 224 that is most likely, as quantified by the penalty function.

Given a non-Gaussian uncertainty distribution, the quantity $M/\beta$ is replaced by some function that evaluates to zero at the point(s) of maximum probability on the PDF and evaluates to one at the points of some lower probability bound on the PDF:

$$f(\arg_x \max f(x)) = 0, f(\arg_x f(x) = PDF_{LB}) = 1 \tag{19}$$

The third step 226 in the solver involves computing the gradient of the cost function with respect to the vehicle position and attitude:

$$g_k = \left[\frac{\partial c_k}{\partial P_x}, \frac{\partial c_k}{\partial P_y}, \frac{\partial c_k}{\partial P_z}, \frac{\partial c_k}{\partial A_\phi}, \frac{\partial c_k}{\partial P_\theta}, \frac{\partial c_k}{\partial P_\psi}\right]^T \tag{20}$$

The automatic differentiation technique is straightforward to apply to the sensor model's world-to-image transform, and because this technique yields exact gradients, its use is recommended here.

In the fourth step 228, the solver uses the gradient to find a step in vehicle position/attitude that decreases the value of the cost function. Various methods can be used to find a feasible step including steepest descent and conjugate gradient. Once a feasible step has been found, the solver applies this step in order to construct a new sensor model.

This process repeats until some termination criteria is satisfied. The termination criteria might consist of the inability to find a feasible step or a maximum number of iterations. It is not required that the solver find and converge to a minimum. Every feasible step the solver takes brings the tie points into better alignment and improves upon the INS's navigation solution. If the solver terminates before finding a minimum, the measurement covariance will correctly indicate less confidence in this measurement.

The feedback and use of the uncertainty distribution of the INS' state estimate has an effect on the measurement covariance. When performing parameter estimation using a least squares approach, the covariance on the resulting parameters can be computed as:

$$P = MSE \cdot (J^T J)^{-1}, \ MSE = \frac{r^T r}{n_{obs} - n_{param}} \tag{21}$$

In the above equation, J is the Jacobian matrix evaluated at the least squares solution, MSE is the mean square error, r is the vector of residuals at the solution, $n_{obs}$ is the number of observations in the least squares problem, and $n_{param}$ is the number of parameters being estimated. The covariance matrix should accurately describe the confidence or certainty of the measurement. For example, a highly uncertain measurement should have a very large covariance. A highly uncertain measurement with a small covariance would likely corrupt the INS's solution.

Given an initial point in the solver's search space $x_0$ and a minimum point in the solver's search space $x_{min}$ that is far from the mean and thus heavily penalized, the penalty function causes the solver to arrive at a solution $x_{sol}$ that lies somewhere between $x_0$ and $x_{min}$. The resulting covariance is larger because, by definition, $MSE(x_{sol}) > MSE(x_{min})$. Additionally, generally $g(x_{sol}) < g(x_{min})$ (the gradients evaluated at these points), which also results in a larger covariance.

Although it initially appears counter-intuitive that generating a larger covariance is preferable, it is important to remember that the primary objective is that the covariance accurately captures the measurement's uncertainty. In this case, the inclusion of the penalty function performs the role of inflating the otherwise overly optimistic covariance matrices.

Figure 10A:
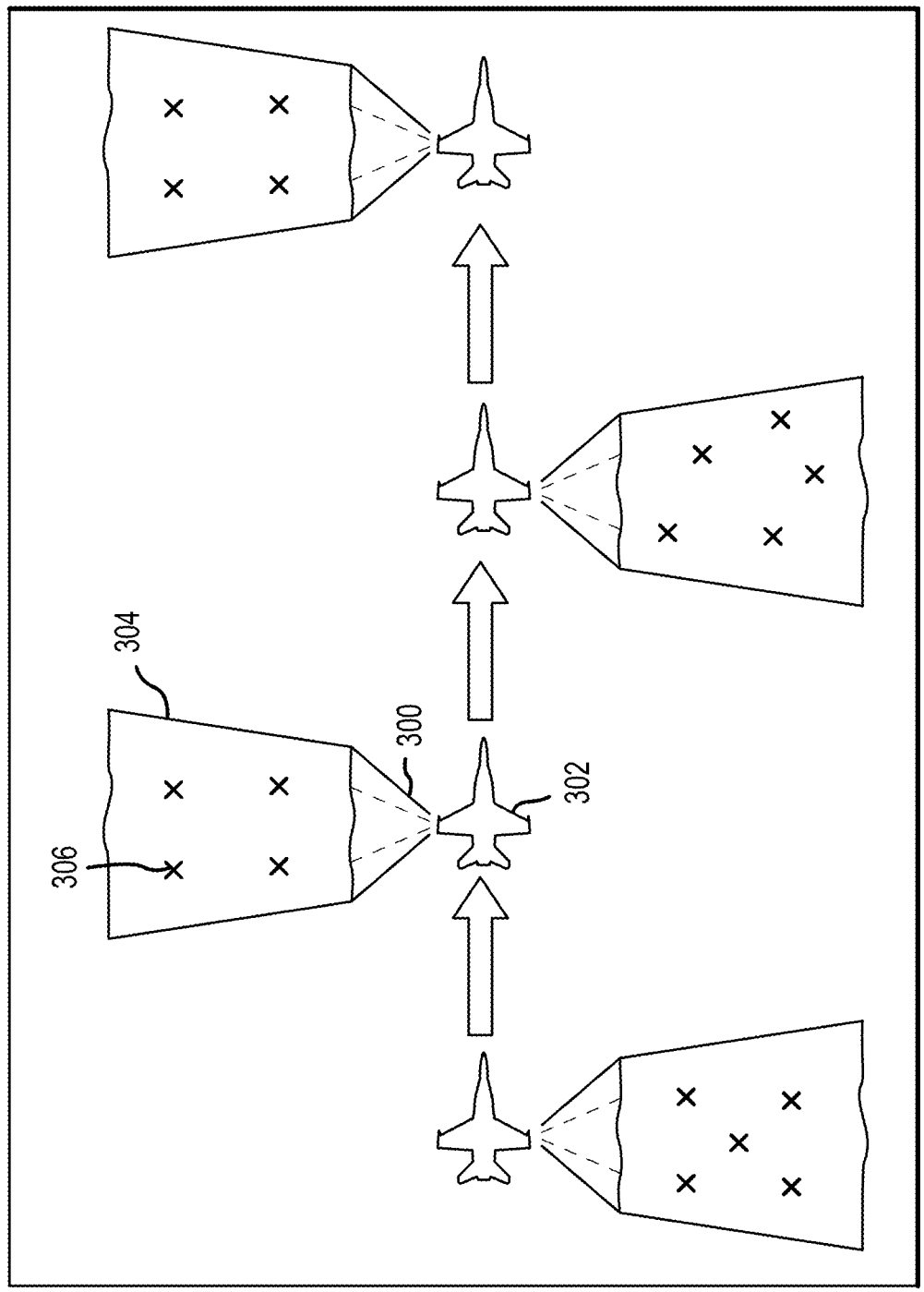
FIGS. 10a-10c illustrate different embodiments in which the tie points for multiple images are aligned simultaneously.
Figure 10B:
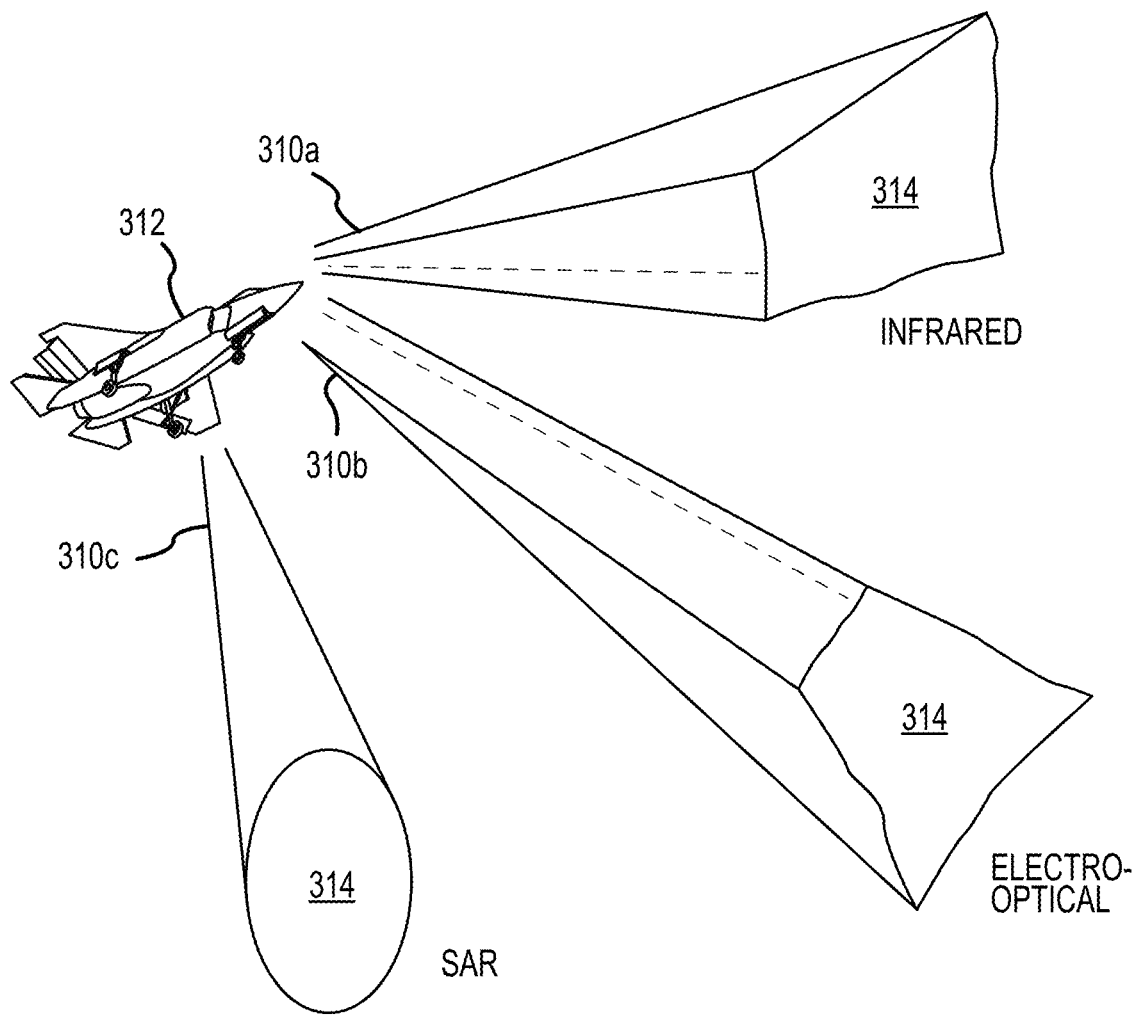
Figure 10C:
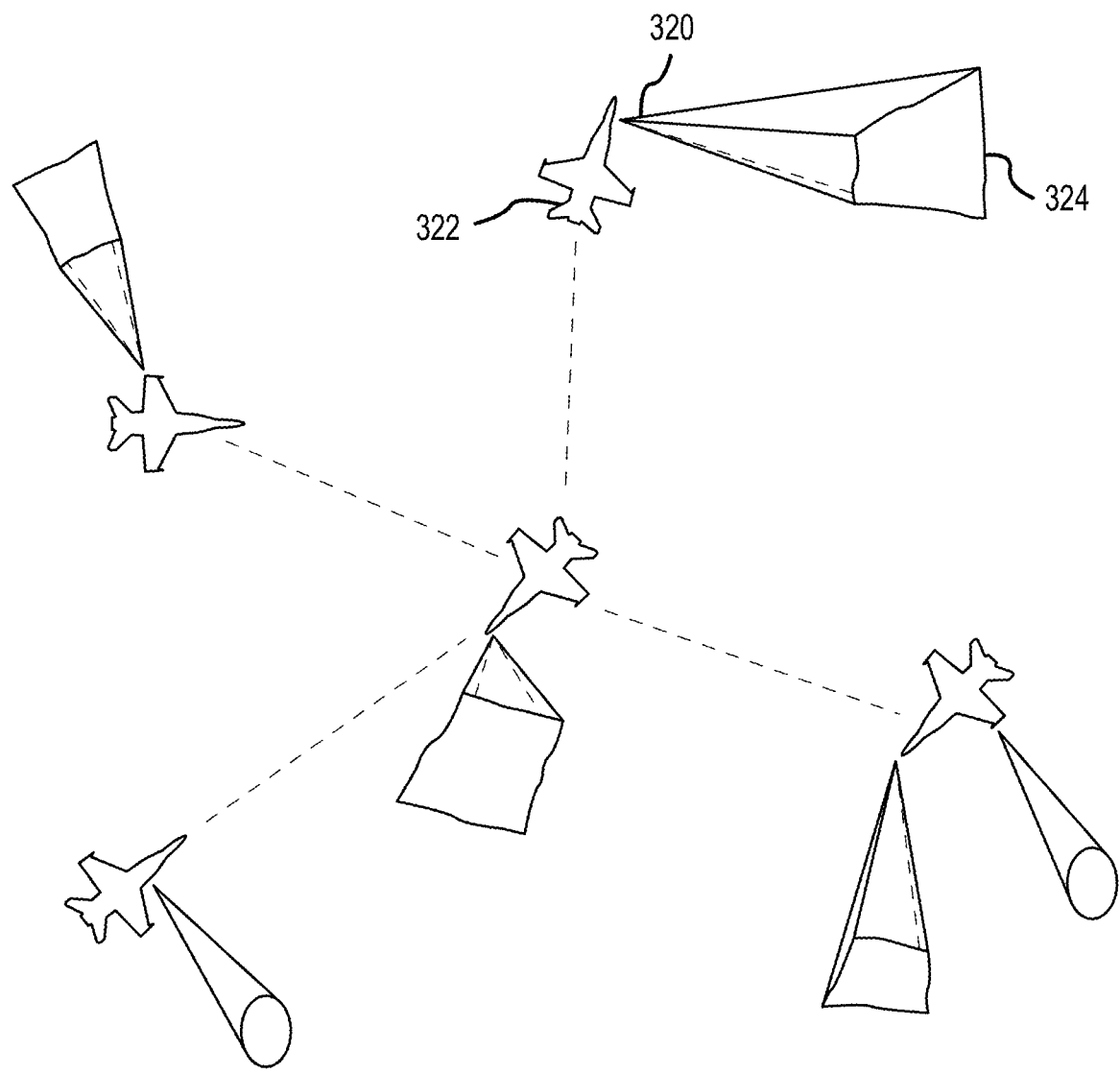

Referring now to FIGS. 10a-10c, multiple sensor images from either the same sensor or different sensors of different modalities on the same or different vehicles generate multiple sensor images. In FIG. 10a, a single sensor 300 on a vehicle 302 generates multiple sensor images 304 with tie points 306. In FIG. 10b, multiple sensors of IR, EO and SAR modalities 310a, 310b and 310c on a vehicle 312 generate multiple sensor images 314. In FIG. 10c, multiple sensors 320 of the same or different modalities on different vehicles 322 generate multiple sensor images 324. The set of multiple sensor images are projected into a common space with the reference image to generate multiple sets of projected sensor images. Each set is correlated with the reference image to select one of the candidate sensor models for each set to generate multiple sets of tie points. The tie points can be found for each image individually or all images can be projected to create a composite ortho-rectified sensor images. The sensor model parameter solver performs the constrained optimization of the sensor model simultaneously on the multiple sets of tie points to generate a single full six degree-of-freedom absolute position and attitude update.

In the multi-image registration process, the relative displacement (translation and rotation) between imaging events is assumed to be an accurate, deterministic quantity. The validity of this assumption improves under the following two conditions:
1. The quality of the IMU improves. Given a constant imaging rate, a higher quality IMU experiences less drift between imaging events.
2. The time interval between imaging events decreases. Regardless of the IMU quality, this limits the drift that occurs between imaging events.

When the displacement errors are small and the multiple images significantly expand the sensor footprint, the resulting improved geometry of the problem more than compensates for the displacement errors. If the displacement errors are large enough to corrupt the image geo-registration measurement, and if the uncertainties in the relative displacements are known, the displacements can be treated as probabilistic quantities in the sensor model parameter solver.

Figure 11A:
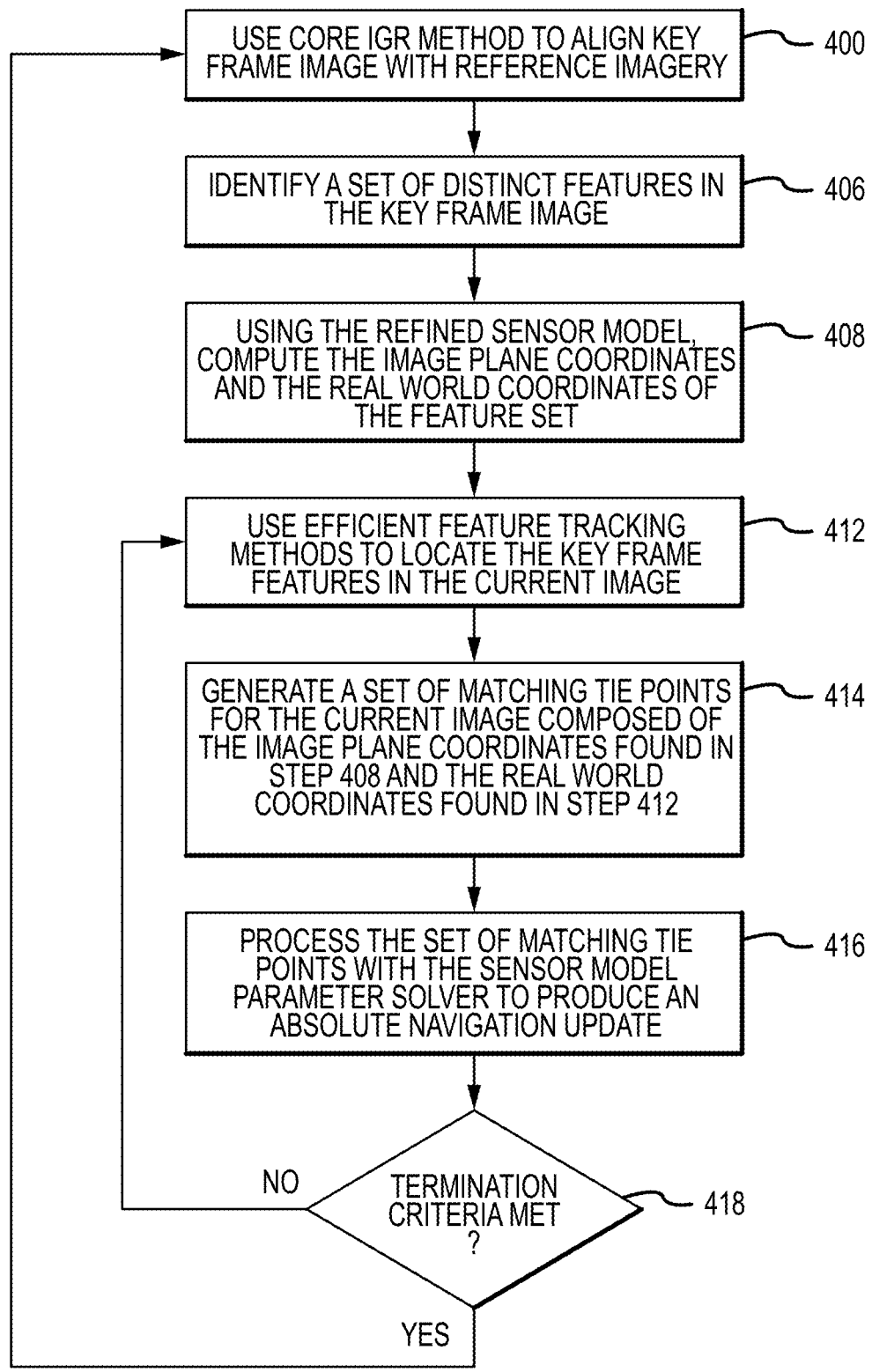
FIGS. 11a and 11b are, respectively, a flow diagram and illustration of an embodiment in which the full optimization generates key frames and between key frames features are tracked to generate the tie points input to the sensor model parameter solver.
Figure 11B:
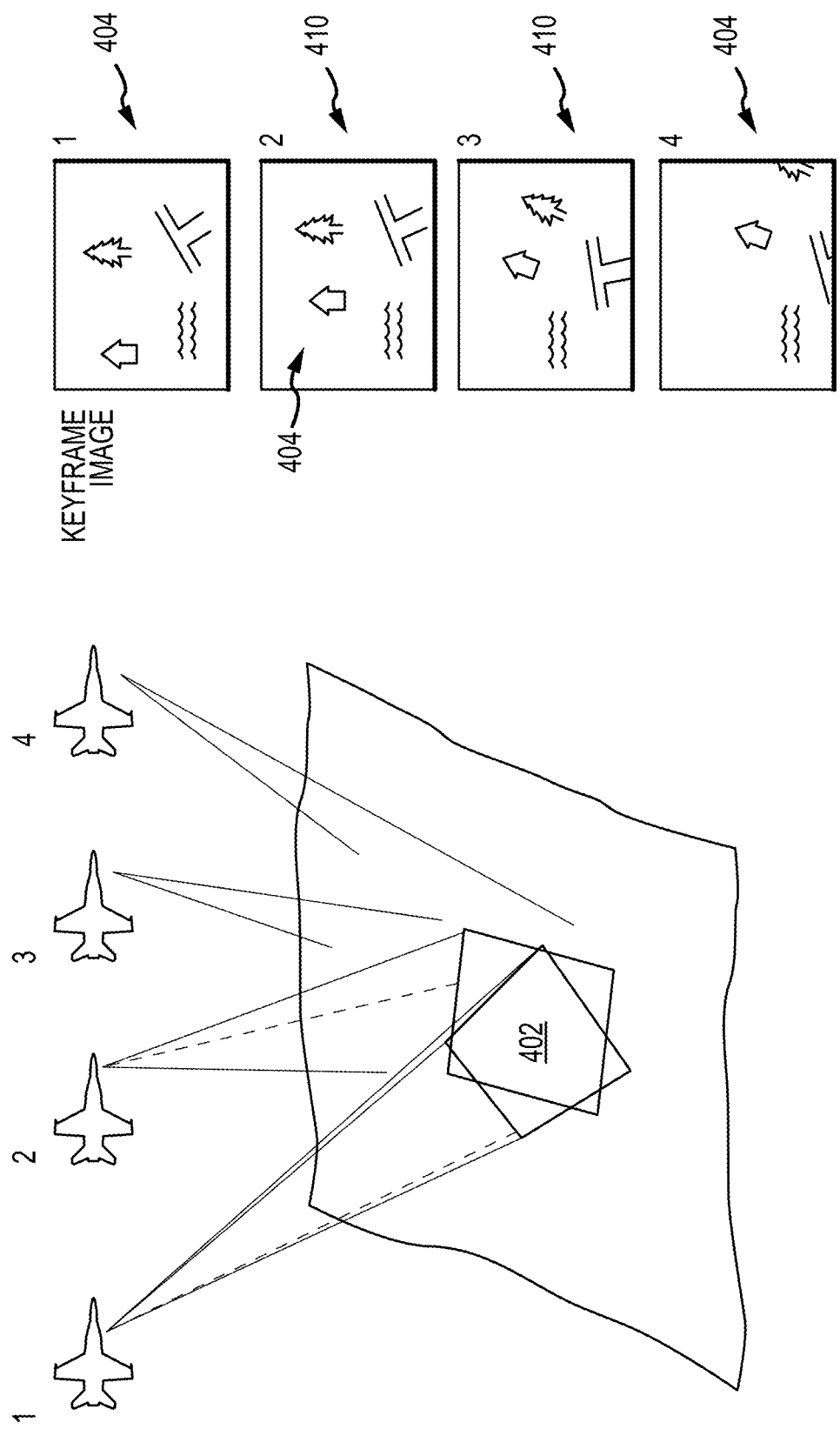

Referring now to FIGS. 11a and 11b, key frame images and the use of efficient feature tracking algorithms to generate tie points between key frames can improve the computational efficiency of the image geo-registration (IGR) process. In step 400, a sensor image 402 is designated as a key frame image 404 and processed according to the above described IGR process to align the key frame image 404 with reference image to produce a refined sensor model and an absolute navigation update. A set of distinct features are identified in key frame image 404 (step 406). The refined sensor model is used to compute the image plane coordinates and the real world coordinates of the feature set for the key frame (step 408).

Subsequent sensor images 410 are processed using efficient feature tracking methods to locate the key frame features in the current image (step 412). The current image does not undergo ortho-rectification or pre-correlation, hence the improvement in computational efficiency. A set of matching tie points are generated (step 414) for the current sensor image composed of the image plane coordinates found in step 412 and the real world coordinates found in step 408. The sensor model parameter solver processes the set of matching tie points to produce the next absolute navigation update (step 416). Steps 412, 414 and 416 are repeated on the next sensor image 410 until a termination criteria is met (step 418). A termination criteria may require a minimum amount of overlap with the key frame image or a minimum proportion of successfully tracked features relative to the number of features originally extracted from the key frame image. If the termination criteria is not met, the process returns to step 400 in which the next sensor image is designated and processed as a key frame image.

In the feature tracking registration method, images 410 subsequent to the key frame image 404 can be registered back to the key frame image or they can be registered to the previous image in the sequence.

Approach 1: $I_{KF} \leftarrow I_{KF+1}, I_{KF} \leftarrow I_{KF+2} \ldots I_{KF} \leftarrow I_{KF+N}$ Approach 2: $I_{KF} \leftarrow I_{KF+1}, I_{KF+1} \leftarrow I_{KF+2} \ldots I_{KF+N-1} \leftarrow I_{KF+N}$ In approach 2, only the set of features matched from $I_{KF} \leftarrow I_{KF+1}$ proceed to the $I_{KF+1} \leftarrow I_{KF+2}$ registration, and so on.

Registering back to the key frame image prioritizes accuracy, as the only sources of error are feature localization errors in the original key frame-to-reference imagery registration and feature localization errors in the key frame-to-current frame registration. However, registering back to the key frame can make finding feature correspondences more difficult once there exists a significant displacement between the key frame image and the current image.

Registering to the previous image increases the probability of finding feature correspondences at the expense of accuracy. Because the displacement between the current image and the previous image will likely be less than the displacement between the current image and the key frame image, feature correspondences will be easier to find. However, the small feature localization errors present during each registration are allowed to build up over successive registrations.

The image geo-registration system can be applied to autonomous land vehicles aka self-driving cars. The autonomous vehicle has an inertial navigation system (INS), composed of an inertial measurement unit (IMU) and a prediction filter. The INS for an autonomous vehicle might also comprise a wheel odometry system, in which the distance traveled is measured by wheel rotations. A visual odometry system might also be present that measures relative displacements between subsequent images.

An autonomous vehicle image geo-registration system still uses a reference imagery database. However, instead of imagery taken from an aerial view, this database consists of imagery taken from various perspectives much closer to ground level. The reference imagery database is accompanied by metadata comprised of the sensor pose and sensor transforms associated with each reference image. The 3-D scene model is, for example, a point cloud depth map. Using the 3-D model of the scene, the sensor image and reference image projectors project/transform the sensor and reference imagery into a common matching space. From this point, the Image Correlator and Sensor Model Parameter Solver operate in the same manner.

In the autonomous vehicles case, there might be other sensors onboard that reduce the uncertainty in one or more of the position/attitude states. Or, the navigation system might assume that the vehicle is fixed to the ground, which would significantly reduce the uncertainty in the vertical position channel. The prediction filter accurately maintains the uncertainty in these states, no matter the magnitude of the uncertainty. The full PVA and uncertainty distribution are still used to generate candidate sensor models and to shape the optimization search space. When there is very little uncertainty in a given state, this communicates to these blocks that there very little variability should be allowed in that state, thereby effectively removing that degree of freedom from the problem. The image geo-registration system outlined in this patent seamlessly handles these cases.

Figure 12:
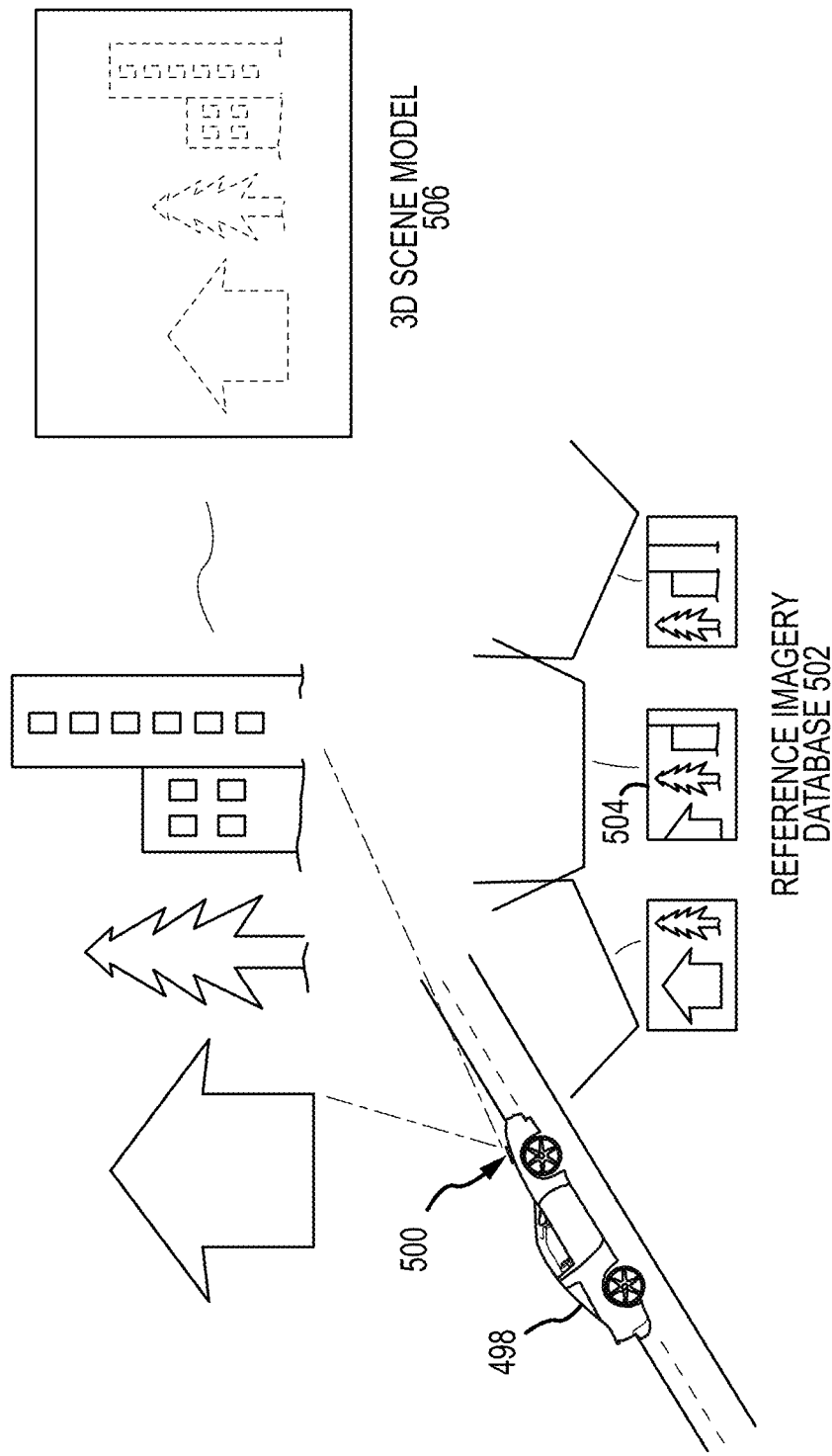
FIG. 12 illustrates an embodiment of an autonomous land vehicle configured to implement image geo-registration to provide absolute 6 degree of freedom position and attitude updates.

As shown in FIG. 12, in an embodiment of an autonomous vehicle 498 an imaging sensor 500 is mounted on the autonomous vehicle. As in the aerial case, this imaging sensor is modeled with a sensor model that describes how the image pixels project out into the world and how real world objects back-project into the image plane. A reference imagery database 502 comprises imagery taken at various perspectives much closer to ground level. This imagery captures scenes that the autonomous vehicle is expected to pass by. Associated with each image in the reference imagery database 52 is a unique reference image sensor model 504. This reference image sensor model serves the same purpose as the sensor image sensor model. It includes the external pose of the sensor as well as a model of the imaging geometry of the sensor. Using the reference image sensor model in conjunction with a 3-D scene model 506, the Reference Image Projector determines the 3-D absolute position of the scene objects. Using the sensor model of the autonomous vehicle's imaging sensor 500 in combination with the reference image sensor model 504 and a 3-D scene model 506, the sensor image and reference image projectors transform the sensor and reference imagery into a common matching space. At this point, the image correlation and sensor model parameter optimizer steps proceed in the same manner as the aerial/underwater cases.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of image geo-registration to provide absolute position updates, absolute attitude updates, and a measurement uncertainty distribution for both the absolute position and absolute attitude updates to a navigation system that includes an inertial measurement unit (IMU), a prediction filter, a sensor for collecting sensor images, a reference image database and a 3-D scene model database, the method comprising:
    feeding back a state estimate of position, velocity and attitude with an uncertainty distribution of the position, velocity and attitude estimates from the prediction filter to a reference image projector and a sensor image projector to generate, based upon a 3-D scene model, a projected reference image and a plurality of candidate sensor model transforms and their resulting projected sensor images in a common space using samples drawn from the uncertainty distribution of the state estimate;
    correlating the resulting projected sensor images to the projected reference image to select one of the candidate sensor model transforms and one of the resulting projected sensor images;
    generating a set of matching tie points between the selected projected sensor image and the reference image; and
    feeding back the state estimate with its uncertainty distribution to a sensor model parameter solver that solves a constrained optimization problem to generate a plurality of sensor model solutions, said uncertainty distribution shaping the topology of a search space by scoring the plurality of sensor model solutions and penalizing low probability solutions to guide the solver to a solution that provides full six degree-of-freedom absolute position updates, absolute attitude updates and the measurement uncertainty distribution for both the absolute position and absolute attitude updates for the navigation system.

2. The method of claim 1, wherein for autonomous navigation in an aerial or underwater vehicle the reference and sensor image projectors ortho-rectify the reference image and plurality of candidate sensor images such that the common space is a digital elevation surface that creates a vertical view of the reference and sensor images.

3. The method of claim 1, further comprising:
    feeding back the state estimate with its uncertainty distribution to compute probabilistic bounds of a sensor image footprint to determine the extent of reference imagery to extract from the reference image database and provide the extracted reference image to the reference image projector.

4. The method of claim 1, wherein said tie points comprise the absolute coordinates and the sensor image pixel coordinates of visual features common to both the projected reference and sensor images.

5. The method of claim 1, wherein the measurement and prediction filter uncertainty distributions are provided as covariance matrices.

6. The method of claim 1, wherein samples drawn from the uncertainty distribution of the state estimate represent possible navigation states, each possible navigation state being used to generate one of the candidate sensor model transforms and its candidate projected sensor image.

7. The method of claim 1, wherein the sensor model solver scores potential absolute position updates and absolute attitude updates based upon their likelihood of occurring according to the uncertainty distribution of the state estimate and incorporates the score into the solver's cost function such that the search space is constrained to a certain geographic bounds and, within those geographic bounds, the topology of the search space is shaped to prioritize higher probability regions to guide the solver to the solution.

8. The method of claim 7, wherein the solver performs the following four steps in an iterative manner to align the images and generate the solution,
    back-projecting the known real-world coordinates of the matching tie points into the image plane via the sensor model's world-to-image transform and computing a sum of squared residuals between the back-projected locations and the known image plane coordinates to form the basis of the cost function;
    computing a penalty based on the current sensor model's likelihood of occurring according to the uncertainty distribution of the state estimate;
    computing the gradient of the cost function with respect to position and attitude; and
    using the gradient to find a step in the position and attitude that decreases the value of the cost function.

9. The method of claim 1, wherein multiple sensor images from either the same sensor or different sensors of different modalities generate multiple sensor images that are projected into the common space with the reference image to generate multiple sets of projected candidate sensor images with each set correlated with the reference image to select one of the candidate sensor models of each set to generate multiple sets of tie points, wherein the sensor model parameter solver performs the constrained optimization of the sensor model simultaneously on the multiple sets of tie points to generate a single full six degree-of-freedom absolute position and attitude update.

10. The method of claim 1, wherein the projected sensor image is initialized as a key frame image and is correlated to the projected reference image to produce a set of key frame features, wherein between key frame initializations features are extracted from sensor images and tracked against the key frame or the previous frame to generate tie points upon which the constrained optimization of the sensor model is performed to generate the updates.

11. The method of claim 1, wherein the method provides absolute position updates and absolute attitude updates for an autonomous land vehicle.

12. An image geo-registration (IGR) system configured to provide absolute position updates, absolute attitude updates, and a measurement uncertainty distribution for both the absolute position and absolute attitude updates to a navigation system that includes an inertial measurement unit (IMU), a prediction filter, a sensor for collecting sensor images, a reference image database and a 3-D scene model database, the IGR system comprising:
    a reference image projector and a sensor image projector configured to receive a state estimate of position, velocity and attitude with an uncertainty distribution of the position, velocity and attitude estimates fed back from the prediction filter and generate, based upon a 3-D scene model, a projected reference image and a plurality of candidate sensor model transforms, and their resulting projected sensor images in a common space using samples drawn from the uncertainty distribution of the state estimate;
    an image correlator configured to correlate the resulting projected sensor images to the projected reference image to select one of the candidate sensor model transforms and one of the resulting projected sensor images and generate a set of matching tie points between the selected projected sensor image and the reference image, and a sensor model parameter solver configured to receive the state estimate with its uncertainty distribution fed back from the prediction filter and solve a constrained optimization problem to generate a plurality of sensor model solutions, said uncertainty distribution shaping the topology of a search space by scoring the plurality of sensor model solutions and penalizing low probability solutions to guide the solver to a solution that provides full six degree-of-freedom absolute position updates and absolute attitude updates and the measurement uncertainty distribution for both the absolute position and absolute attitude updates for the navigation system.

13. The IGR system of claim 12, wherein for autonomous navigation in an aerial or underwater vehicle the reference and sensor image projectors ortho-rectify the reference image and plurality of candidate sensor images such that the common space is a digital elevation surface that creates a vertical view of the reference and sensor images.

14. The IGR system of claim 12, further comprising:
a reference imagery database manager configured to receive the state estimate with its uncertainty distribution from the prediction filter to compute probabilistic bounds of a sensor image footprint to determine the extent of reference imagery to extract from the reference image database and provide the extracted reference image to the reference image projector.

15. The IGR system of claim 12, wherein said tie points comprise the absolute coordinates and the sensor image pixel coordinates of visual features common to both the projected reference and sensor images.

16. The IGR system of claim 12, wherein the measurement and prediction filter uncertainty distributions are provided as covariance matrices.

17. The IGR system of claim 12, wherein samples drawn from the uncertainty distribution of the state estimate represent possible navigation states, each possible navigation state being used to generate one of the candidate sensor model transforms and its candidate projected sensor image.

18. The IGR system of claim 12, wherein the sensor model solver scores potential absolute position and attitude updates based upon their likelihood of occurring according to the uncertainty distribution of the state estimate and incorporates the score into the solver's cost function such that the search space is constrained to a certain geographic bounds and, within those geographic bounds, the topology of the search space is shaped to prioritize higher probability regions to guide the solver to the solution.

19. The IGR system of claim 12, wherein the solver is configured to perform the following four steps in an iterative manner to align the images and generate the solution,
back-projecting the known real-world coordinates of the matching tie points into the image plane via the sensor model's world-to-image transform and computing a sum of squared residuals between the back-projected locations and the known image plane coordinates to form the basis of the cost function;
computing a penalty based on the current sensor model's likelihood of occurring according to the uncertainty distribution of the state estimate;
computing the gradient of the cost function with respect to position and attitude; and
using the gradient to find a step in the position and attitude that decreases the value of the cost function.

20. The IGR system of claim 12, wherein multiple sensor images from either the same sensor or different sensors of different modalities generate multiple sensor images that are projected into the common space with the reference image to generate multiple sets of projected candidate sensor images with each set correlated with the reference image to select one of the candidate sensor models of each set to generate multiple sets of tie points, wherein the sensor model parameter solver is configured to perform the constrained optimization of the sensor model simultaneously on the multiple sets of tie points to generate a single full six degree-of-freedom absolute position and attitude update.

21. The IGR system of claim 12, wherein the projected sensor image is initialized as a key frame image and is correlated to the projected reference image to produce a set of key frame features, wherein between key frame initializations features are extracted from sensor images and tracked against the key frame or the previous frame to generate tie points upon which the constrained optimization of the sensor model is performed to generate the updates.

22. The IGR system of claim 12, further comprising an autonomous land vehicle.

* * * * *